United States Patent
Onishi

(10) Patent No.: US 10,601,716 B2
(45) Date of Patent: Mar. 24, 2020

(54) COMMUNICATION PREDICTION APPARATUS AND COMMUNICATION PREDICTION METHOD, AND RECORDING MEDIUM STORING COMPUTER PROGRAM

(71) Applicant: NEC Corporation, Minato-ku, Tokyo (JP)

(72) Inventor: Takeo Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/772,926

(22) PCT Filed: Dec. 2, 2016

(86) PCT No.: PCT/JP2016/085922
§ 371 (c)(1),
(2) Date: May 2, 2018

(87) PCT Pub. No.: WO2017/094890
PCT Pub. Date: Jun. 8, 2017

(65) Prior Publication Data
US 2018/0324099 A1    Nov. 8, 2018

(30) Foreign Application Priority Data
Dec. 4, 2015   (JP) ................. 2015-237765

(51) Int. Cl.
*H04L 12/801* (2013.01)
*H04M 11/00* (2006.01)
(Continued)

(52) U.S. Cl.
CPC .......... *H04L 47/127* (2013.01); *H04L 47/823* (2013.01); *H04M 11/00* (2013.01); *H04W 24/08* (2013.01); *H04W 28/0289* (2013.01)

(58) Field of Classification Search
None
See application file for complete search history.

(56) References Cited

U.S. PATENT DOCUMENTS

2006/0002532 A1 *   1/2006   Horvitz ................ H04L 41/147
                                                  379/112.01
2007/0190988 A1 *   8/2007   Kikuta .................... H04W 4/00
                                                  455/414.1
(Continued)

FOREIGN PATENT DOCUMENTS

JP    2005-348375 A    12/2005
JP    2015-035770 A    2/2015
(Continued)

OTHER PUBLICATIONS

International Search Report for PCT Application No. PCT/JP2016/085922, dated Jan. 17, 2017.
(Continued)

*Primary Examiner* — Anh Ngoc M Nguyen

(57) ABSTRACT

Provided is, for example, a communication prediction apparatus that can predict, with a higher degree of precision, communication to be performed by an object terminal even when a communication trend changes with changes in the state of the object terminal. A communication prediction apparatus 23 is provided with: a communication monitoring unit 101 that monitors communication performed between an information processing terminal 10 and an application server 30; a terminal-state determination unit 102 that determines a terminal state of the information processing terminal 10; and a communication prediction unit 104 that predicts communication to be performed by the information processing terminal 10 in a period from a point in time of interest to a point in time at which a predetermined time has elapsed.

12 Claims, 14 Drawing Sheets

(51) Int. Cl.
*H04L 12/911* (2013.01)
*H04W 24/08* (2009.01)
*H04W 28/02* (2009.01)

(56) References Cited

U.S. PATENT DOCUMENTS

| | | |
|---|---|---|
| 2015/0043342 A1 | 2/2015 | Hayashi et al. |
| 2016/0034823 A1* | 2/2016 | Farkas .................. H04W 16/22 |
| | | 706/12 |
| 2017/0055284 A1* | 2/2017 | Min ...................... H04W 74/08 |

FOREIGN PATENT DOCUMENTS

| | | |
|---|---|---|
| JP | 2015-097334 A | 5/2015 |
| JP | 2015-201698 A | 11/2015 |

OTHER PUBLICATIONS

English translation of Written opinion for PCT Application No. PCT/JP2016/085922.

\* cited by examiner

| COMMUNICATION TIME | TERMINAL IDENTIFIER | TERMINAL STATE (SCREEN) |
|---|---|---|
| 14:23:10 | 10-1 | ON |
| 14:23:11 | 10-1 | ON |
| 14:23:11 | 10-2 | OFF |
| 14:23:20 | 10-1 | ON |
| ⋮ | ⋮ | ⋮ |

COMMUNICATION PREDICTION APPARATUS AND COMMUNICATION PREDICTION METHOD, AND RECORDING MEDIUM STORING COMPUTER PROGRAM

This application is a National Stage Entry of PCT/JP2016/085922 filed on Dec. 2, 2016, which claims priority from Japanese Patent Application 2015-237765 filed on Dec. 4, 2015, the contents of all of which are incorporated herein by reference, in their entirety.

TECHNICAL FIELD

The present invention relates to a technical field in which communication to be performed by an information processing terminal such as a smartphone is predicted, for example.

BACKGROUND ART

As an information processing terminal such as a smartphone is spread, an amount of packet flowing through a mobile communication network (hereinafter, simply referred to as a "mobile network" in the present application), and a communication frequency between an information processing terminal and an external device are rapidly increasing. Consequently, deterioration of communication quality is likely to occur by congestion of a mobile network.

More specifically, when communication is performed in mobile communication using a communication technique such as a long term evolution (LTE), as an example, an information processing terminal performs request processing of requesting wireless connection to a mobile network. By the request processing, the information processing terminal is able to receive allocation of a wireless resource. On the other hand, when it becomes unnecessary to perform communication, the information processing terminal performs release processing of requesting release of wireless connection to the mobile network. Consequently, the information processing terminal is able to release the allocated wireless resource. In this way, in the aforementioned mobile communication, it is possible to share and use a wireless resource among a plurality of information processing terminals. A plurality of information processing terminals are able to effectively use a wireless resource, even when the wireless resource is finite.

However, when a plurality of information processing terminals start communication simultaneously or substantially simultaneously, for example, in mobile communication, not only time is required for the request processing, but also request processing may fail. Specifically, in this case, deterioration of communication quality may occur in mobile communication.

Further, in a mobile network using a communication technique such as an LTE, it is known that processing called a handover such that an information processing terminal switches from a communicatively connected wireless base station to another wireless base station is performed. Thus, an information processing terminal is able to communicate with a wireless base station without interruption, even when the information processing terminal is being carried.

However, for example, when information processing terminals carried by a plurality of users moving by train or the like perform a handover all at once, processing load may be concentrated on a mobile network device such as a wireless base station. Further, the aforementioned wireless resource may be depleted. Therefore, not only time is required for an information processing terminal and a mobile network device to complete a handover, but also a handover may fail. Thus, the aforementioned communication quality may be deteriorated.

For example, PTLs 1 and 2 are present, as a method for reducing deterioration of communication quality, which may occur by congestion of a mobile network as described above.

A technique disclosed in PTL 1 predicts whether or not an information processing terminal requests wireless connection in the future, based on a request history on requested wireless connection when a wireless bearer is allocated to the information processing terminal. Further, when a number (a request number) of predicted information processing terminals exceeds a predetermined threshold value, the technique instructs a part of the predicted information processing terminals to request wireless connection. Consequently, information processing terminals requesting wireless connection are dispersed in terms of time. Thus, the technique is able to reduce congestion of a mobile network. Specifically, the technique is able to suppress deterioration of communication quality.

PTL 2 discloses a technique of predicting communication advantages and disadvantages of a connection pattern between an information processing terminal and a communication network (e.g. a mobile network). Specifically, the technique disclosed in PTL 2 predicts communication advantages and disadvantages of a specific connection pattern, when communication is performed by the selected specific connection pattern among a plurality of connection patterns. Further, the technique presents predicted communication advantages and disadvantages. Thus, the technique is able to allow a user to select a connection pattern depending on a change in communication environment from among a plurality of connection patterns.

CITATION LIST

Patent Literature

[PTL 1] Japanese Laid-open Patent Publication No. 2015-035770

[PTL 2] Japanese Laid-open Patent Publication No. 2005-348375

SUMMARY OF INVENTION

Technical Problem

Particularly, the technique disclosed in PTL 1 among the aforementioned techniques is able to reduce congestion of a mobile network by predicting communication to be performed periodically. Specifically, the technique is able to suppress deterioration of communication quality, which may occur by congestion of a mobile network. In the technique, however, it may not be possible to effectively reduce congestion of a mobile network. Specifically, in the technique, there is a problem that it is difficult to accurately predict whether or not an information processing terminal requests wireless connection (in other words, whether or not communication is performed). In the following, a reason for this is described in detail.

Generally, a trend on a data amount of communication, a frequency of communication, and the like to be performed by an information processing terminal (hereinafter, referred to as a "communication trend" in the present application) greatly differs depending on a state of the information processing terminal (hereinafter, referred to as a "terminal state" in the present application). For example, when comparison is made on a communication trend between a case where a display unit (screen) provided on an information processing terminal is turned on, and a case where the screen is turned off, as the terminal state, a data amount of communication and a communication frequency are large in the case where the screen is turned on, as compared with the case where the screen is turned off. In other words, when comparison is made on a communication trend between a case where a user uses an information processing terminal, and a case where a user does not use the information processing terminal, a data amount of communication and a communication frequency are large in the case where a user uses the information processing terminal, as compared with the case where a user does not use the information processing terminal. In this way, a communication trend greatly changes every moment, accompanied by a change in state of an information processing terminal.

Therefore, in the technique disclosed in PTL 1, it may be difficult to predict whether or not an information processing terminal performs communication, taking into consideration a change in communication trend. More specifically, the technique predicts whether or not an information processing terminal requests wireless connection in the future, based on a request history on wireless connection. In other words, the technique predicts communication to be started from now on in an information processing terminal. Therefore, the technique is advantageous when periodically occurring communication is predicted. However, it may be difficult to perform prediction, taking into consideration a change in communication trend, when only a history on communication (communication history) is used. In other words, communication trends are completely different before and after a terminal state changes. Therefore, it may be difficult to perform accurate prediction when only a communication history accumulated before a prediction time (in the past) is used. Consequently, in the technique, it may be difficult to effectively reduce congestion of a mobile network.

Further, the technique disclosed in PTL 2 merely describes that communication advantages and disadvantages which are different depending on a type of connection pattern are predicted. In other words, in the technique, it is still difficult to accurately predict whether or not an information processing terminal performs communication. Consequently, in the technique, it may be difficult to reduce congestion of a mobile network.

A main object of the present invention is to provide a communication prediction apparatus and the like which enable to more accurately predict communication to be performed by a target terminal, even when a communication trend changes, accompanied by a change in state of the target terminal.

Solution to Problem

In order to achieve the aforementioned object, a communication prediction apparatus according to an aspect of the present invention has the following configuration.

A communication prediction apparatus includes: communication monitoring means for monitoring communication to be performed between a target terminal being a monitoring target and an external device, and generating monitoring communication information including information relating to the communication;

terminal state determination means for determining a terminal state of the target terminal, based on at least the monitoring communication information; and communication prediction means for predicting communication to be performed by the target terminal, based on a determination result in past among determination results determined by the terminal state determination means, communication history information associated with the monitoring communication information used in the determination, and a terminal state of the target terminal at a target time, which is newly determined by the terminal state determination means, during a period from the target time until a time after lapse of a predetermined time.

Further, in order to achieve the aforementioned object, a communication prediction method according to an aspect of the present invention has the following configuration.

A communication prediction method includes:

monitoring communication to be performed between a target terminal being a monitoring target and an external device, and generating monitoring communication information including information relating to the communication;

determining a terminal state of the target terminal by determination means, based on at least the monitoring communication information; and predicting communication to be performed by the target terminal, based on a determination result in past among determination results determined by the determination means, communication history information associated with the monitoring communication information used in the determination, and a terminal state of the target terminal at a target time, which is newly determined by the determination means, during a period from the target time until a time after lapse of a predetermined time.

Note that the aforementioned object is also achieved by a computer program causing a computer to implement the communication prediction apparatus and the communication prediction method having the aforementioned respective configurations, and a computer-readable recording medium storing the computer program.

Advantageous Effects of Invention

According to the present invention, it is possible to provide a communication prediction apparatus and the like which enable to more accurately predict communication to be performed by a target terminal, even when a communication trend changes, accompanied by a change in state of the target terminal.

DESCRIPTION OF EMBODIMENTS

In the following, example embodiments of the present invention will be described in detail with reference to the drawings.

First Example Embodiment

Figure 1:
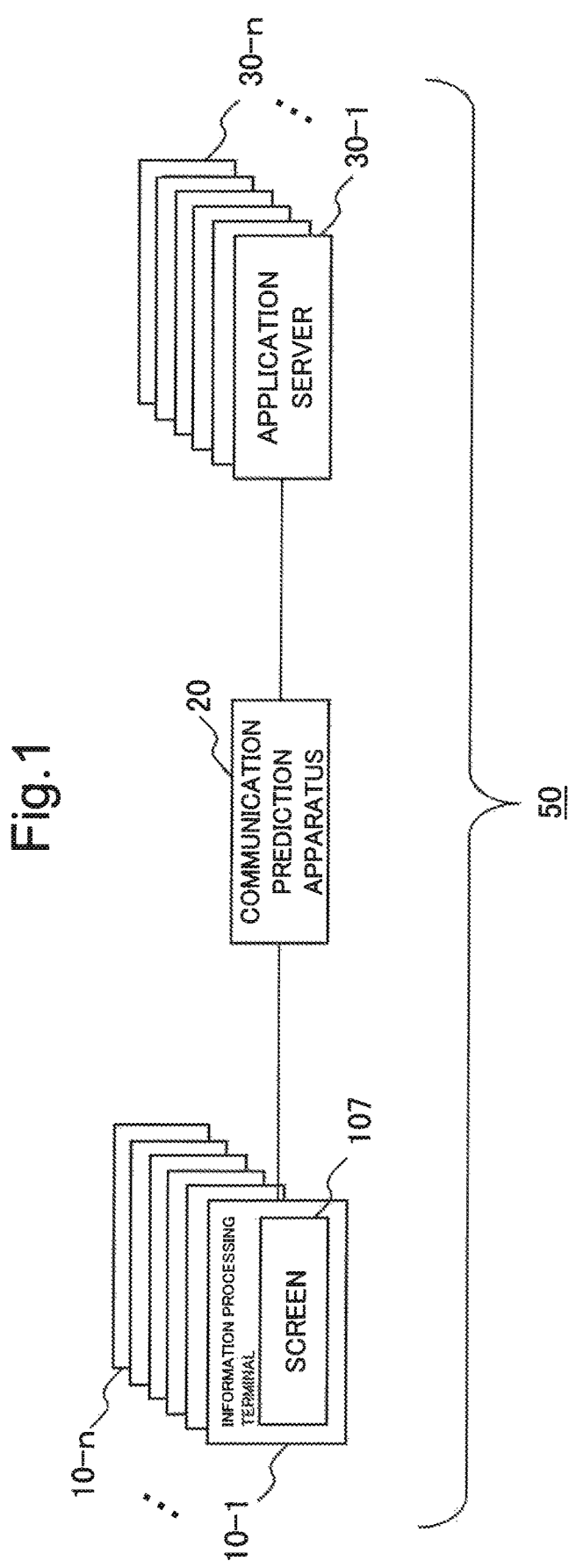
FIG. 1 is a block diagram illustrating a configuration of a communication system including a communication prediction apparatus in a first example embodiment of the present invention.
Figures 2, 3:
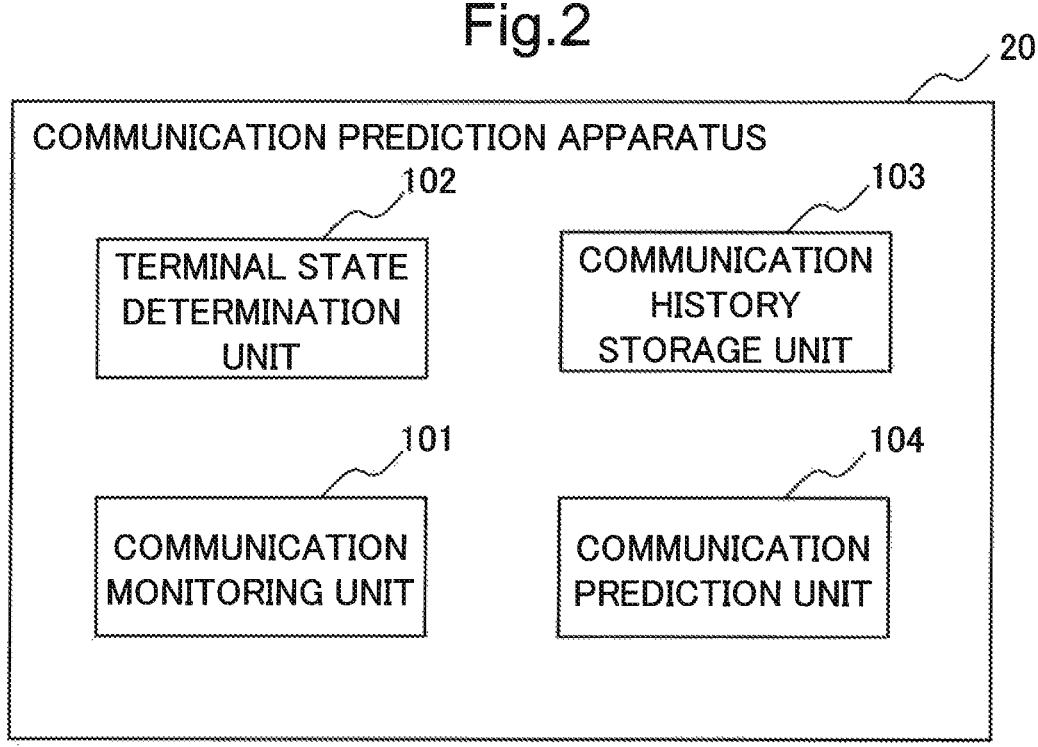
FIG. 2 is a block diagram illustrating a configuration of the communication prediction apparatus in the first example embodiment of the present invention.
FIG. 3 is a diagram specifically exemplifying communication history information C stored in a communication history storage unit in the first example embodiment of the present invention.

FIG. 1 is a block diagram illustrating a configuration of a communication system 50 including a communication prediction apparatus 20 in a first example embodiment of the present invention. Further, FIG. 2 is a block diagram illustrating a configuration of the communication prediction apparatus 20 in the first example embodiment of the present invention.

In FIG. 1, the communication system 50 substantially includes one or more information processing terminals 10 (information processing terminals 10-1 to 10-*n*), the communication prediction apparatus 20, and one or more application servers 30 (application servers 30-1 to 30-*n*), wherein n is a natural number. Further, the information processing terminal 10 includes a screen 107. In FIG. 2, the communication prediction apparatus 20 includes a communication monitoring unit 101, a terminal state determination unit 102, a communication history storage unit 103, and a communication prediction unit 104.

In the present example embodiment, as illustrated in FIG. 1, for example, it is assumed that the communication system 50 includes one or more information processing terminals 10 and one or more application servers 30. The present invention to be described by the present example embodiment as an example is, however, not limited to the aforementioned configuration. The communication system 50 may employ a configuration including information processing terminals 10 of any number and application servers 30 of any number.

In the following description, to simplify description, the information processing terminals 10-1 to 10-*n* are generically and simply referred to as information processing terminals 10. When it is necessary to distinguish and describe individual information processing terminals 10, in the following description, the information processing terminals 10 are referred to as the information processing terminal 10-1, the information processing terminal 10-2, . . . , and the information processing terminal 10-*n*. Further, likewise, in the following description, the application servers 30-1 to 30-*n* are generically and simply referred to as application servers 30. When it is necessary to distinguish and describe individual application servers 30, in the following description, the application servers 30 are referred to as the application server 30-1, the application server 30-2, . . . , and the application server 30-*n*.

More specifically, in FIG. 1, the information processing terminal (target terminal) 10 being a monitoring target is, for example, a communication terminal such as a smartphone capable of performing mobile communication such as an LTE. The screen 107 is a display unit provided on the information processing terminal 10.

The application server (external device) 30 is, for example, a server device for providing the information processing terminal 10 with various types of services.

The information processing terminal 10 and the application server 30 are communicatively connected via a wireless or wired communication network.

Nowadays, however, it is possible to use a general technique regarding a configuration and an operation of the information processing terminal 10 including the screen 107, and the application server 30. Therefore, detailed description in the present example embodiment is omitted (hereinafter, the same idea is applied to the respective example embodiments).

The communication prediction apparatus 20 is disposed, for example, at a midway of a communication route between the information processing terminal 10 and the application server 30. Further, the communication prediction apparatus 20 monitors communication to be performed between the information processing terminal 10 and the application server 30. The communication prediction apparatus 20 predicts communication to be performed by the information processing terminal 10, based on a monitoring result.

More specifically, the communication prediction apparatus 20 may employ a configuration being included in a packet data network (PDN) gateway (P-GW), which is disposed within an evolved packet core (EPC), as an example. Further, the communication prediction apparatus 20 may employ a configuration being included in a proxy device. Alternatively, the communication prediction apparatus 20 may be implemented as one of software modules to be executed within the information processing terminal 10 or the application server 30. Specifically, the communication prediction apparatus 20 may be implemented by any device, when it is possible to monitor communication to be performed between the information processing terminal 10 and the application server 30.

In the following description, more specifically, an operation of each component of the communication prediction apparatus 20 is described with reference to FIG. 2.

As illustrated in FIG. 2, the communication monitoring unit 101 monitors communication to be performed between the information processing terminal 10 being a monitoring target, and the application server 30 being an external device (hereinafter, also simply referred to as "between terminals" in the present application). Specifically, the communication monitoring unit 101 monitors communication information (communication packet) to be exchanged between terminals. As a result of monitoring, the communication monitoring unit 101 notifies the terminal state determination unit 102 and the communication history storage unit 103 of information relating to communication to be performed between terminals (monitoring communication information M).

More specifically, the communication monitoring unit 101 acquires the aforementioned communication packet. The communication monitoring unit 101 generates the monitoring communication information M, based on the acquired communication packet. Specifically, the communication monitoring unit 101 generates the monitoring communication information M by analyzing the acquired communication packet. The communication monitoring unit 101 notifies the terminal state determination unit 102 and the communication history storage unit 103 of the generated monitoring communication information M.

In the following description, it is assumed that the monitoring communication information M includes at least a time (communication time) when the communication is detected, and an identifier (terminal identifier) capable of identifying the information processing terminal 10 which performs the communication. In other words, the monitoring communication information M includes at least information in which a communication time when a communication packet in the communication is acquired, and a terminal identifier of the information processing terminal 10 being a monitoring target are associated with each other.

In the present example embodiment, the communication time may be information indicating a date and time including a time when the aforementioned communication is detected. In the following description, however, to simplify description, information indicating the date and time is also referred to as a communication time.

Further, the terminal identifier indicates an internet protocol (IP) address of the information processing terminal 10 included in a communication packet, for example.

The present invention to be described by the present example embodiment as an example, however, is not limited to the aforementioned configuration. The terminal identifier may be, for example, a tunnel ID (TEID: Tunnel Endpoint Identifier) included in a GTP packet, when a GTP (GPRS Tunneling Protocol) is used as a protocol. Herein, GPRS is an abbreviation of a general packet radio service. In this way, the terminal identifier may be another identifier, when it is possible to identify the information processing terminal 10 (hereinafter, the same idea is applied to the respective example embodiments).

In the following description, to simplify description, an example of a configuration in which the monitoring communication information M includes at least a communication time and a terminal identifier as described above is described, as an example. An example embodiment according to the present invention, however, is not limited to the aforementioned configuration. The monitoring communication information M may employ a configuration including not only a communication time and a terminal identifier, but also the following other information.

In this case, the monitoring communication information M may employ a configuration including an identifier capable of identifying the application server 30 which communicates with the information processing terminal 10, as an example. Further, the monitoring communication information M may employ a configuration including information indicating a port number used in communication between terminals. Further, the monitoring communication information M may employ a configuration including header information of a transmission control protocol (TCP) and header information of a hypertext transfer protocol (HTTP). The monitoring communication information M may employ a configuration including information indicating a communication packet type. The communication packet type is, for example, synchronize (SYN), finish (FIN) of a TCP, and the like. Alternatively, the monitoring communication information M may employ a configuration including a size (data amount) of a communication packet, and a content of a packet (content of data). In this way, the monitoring communication information M may employ a configuration including not only the aforementioned information but also various pieces of information associated with the communication.

In the following description, an operation of the terminal state determination unit 102 is described.

The terminal state determination unit 102 determines a state of the information processing terminal 10 being a monitoring target (hereinafter, referred to as a "terminal state" in the present application) in response to acquiring the monitoring communication information M from the communication monitoring unit 101. Specifically, the terminal state determination unit 102 determines a terminal state of the information processing terminal 10 being a monitoring target, based on at least the monitoring communication information M.

In the present example embodiment, to simplify description, it is assumed that the terminal state indicates a state of the screen 107 provided on the information processing terminal 10, as an example. Specifically, it is assumed that the terminal state indicates a lighting state (on-state) of the screen 107, or a light-out state (off-state) of the screen 107, as a state of the screen 107.

To simplify description, the terminal state is described by the aforementioned configuration as an example. The present invention to be described by the present example embodiment as an example, however, is not limited to the aforementioned configuration.

For example, the terminal state may indicate a communication state accompanied by an on-going application displayed on the screen 107. Further, for example, the terminal state may indicate a communication state accompanied by an application included in a set of one or more applications installed in the information processing terminal 10. The terminal state may indicate a moving state representing whether or not the information processing terminal 10 is being carried, for example. The moving state, however, may indicate a moving speed of the information processing terminal 10. Alternatively, the terminal state may be configured by combining any terminal states among the aforementioned terminal states. The aforementioned terminal state, however, is merely an example. The terminal state may be configured by a state of any information processing terminal 10, which may affect communication to be performed by the information processing terminal 10.

In the following description, an operation of determining a terminal state by the terminal state determination unit 102 is described in more detail.

To simplify description, however, it is assumed that the terminal state determination unit 102 determines, as a terminal state, a state of the screen 107 provided on the information processing terminal 10, as an example.

For example, the terminal state determination unit 102 determines a state of the screen 107, based on the number of TCP sessions being established by the information processing terminal 10.

More specifically, the terminal state determination unit 102 acquires the aforementioned number of sessions, based on a type and an amount of communication packet in communication acquired by the communication monitoring unit 101. Specifically, the terminal state determination unit 102 acquires a difference between the number of SYN packets and the number of FIN packets in a TCP, which are acquired based on information included in a communication packet. Thus, the terminal state determination unit 102 is able to acquire the acquired difference, as the number of sessions.

More specifically, the terminal state determination unit 102 determines that the screen 107 is turned on, when an acquired number of sessions is equal to or larger than a predetermined condition (number of sessions). On the other hand, the terminal state determination unit 102 determines that the screen 107 is turned off, when an acquired number of sessions is smaller than the predetermined condition. This is because when the screen 107 of the information processing terminal 10 is turned on, generally, the number of sessions in a TCP increases. Therefore, the terminal state determination unit 102 is able to accurately determine a state of the screen 107 by a determination method using the number of sessions. Further, for example, when the monitoring communication information M includes information indicating a communication packet type, the terminal state determination unit 102 may determine a state of the screen 107, based on the monitoring communication information M.

In the following description, another determination method different from the aforementioned determination method is described.

(Regarding Determination Method Using Information Relating to Communication)

For example, the terminal state determination unit 102 may determine a state of the screen 107, based on at least one of the following pieces of information relating to communication.

Information (e.g. an IP address and a port number) indicating an address of communication performed by the information processing terminal 10, and a size (byte number) of data, or a content of data in communication preformed between terminals.

For example, an application notifies the application server 30 that a state of the screen 107 has changed depending on a specification of the application to be operated on a smartphone. Alternatively, although an application does not notify the application server 30 that a state of the screen 107 has changed, the application communicates synchronously when the state of the screen 107 is switched. Therefore, by determining a state of the screen 107, based on communication for the purpose of the aforementioned notification, or communication for the purpose of synchronization, the terminal state determination unit 102 is able to accurately determine switching of a terminal state on a real-time basis.

(Regarding Determination Method Using Communication Frequency)

The terminal state determination unit 102 may determine a state of the screen 107, based on a frequency of communication (hereinafter, also referred to as a "communication frequency" in the present application) to be performed by the information processing terminal 10. Specifically, the terminal state determination unit 102 acquires a communication frequency, based on a monitoring result by the communication monitoring unit 101. Further, the terminal state determination unit 102 determines a state of the screen 107, based on the acquired communication frequency. Specifically, the terminal state determination unit 102 determines that the screen 107 is in an on-state, when the acquired communication frequency is higher than a predetermined condition (value).

This means that, when the screen 107 is in an on-state, the information processing terminal 10 performs communication with a high frequency. Therefore, the terminal state determination unit 102 is able to accurately determine a state of the screen 107 by using a communication frequency.

In this way, the terminal state determination unit 102 is able to accurately determine a terminal state of the information processing terminal 10 by using various determination methods. Further, the terminal state determination unit 102 may not only determine a terminal state by the aforementioned respective determination methods, but also determine a terminal state by combining any determination methods among the aforementioned determination methods. Specifically, the terminal state determination unit 102 may determine a terminal state by at least one of these determination methods. Thus, the terminal state determination unit 102 is able to accurately determine various terminal states of the information processing terminal 10.

The present invention to be described by the present example embodiment as an example, however, is not limited to the aforementioned configuration. The terminal state determination unit 102 is able to employ not only the aforementioned determination method but also another determination method. For example, the information processing terminal 10 may notify the communication prediction apparatus 20 of information indicating a terminal state of the information processing terminal 10. Thus, the terminal state determination unit 102 is able to more securely determine a terminal state of the information processing terminal 10, based on information indicating a terminal state acquired from the information processing terminal 10.

The communication history storage unit 103 stores communication history information C in a state that the following information is associated, for each terminal state determined by the terminal state determination unit 102.

A terminal state determined by the terminal state determination unit 102, and information (monitoring communication information M) relating to communication between the information processing terminal 10 notified from the communication monitoring unit 101, and the application server 30.

More specifically, it is assumed that the communication history information C includes at least information in which a terminal state, a communication time included in the monitoring communication information M, and a terminal identifier of the information processing terminal 10 are associated with one another, for each terminal state. In other words, the communication history information C includes information in which a determination result in the past among determination results determined by the terminal state determination unit 102, and the monitoring communication information M used in the determination are associated with each other.

In the following description, the communication history information C is described in more detail with reference to FIG. 3.

FIG. 3 is a diagram specifically exemplifying the communication history information C stored in the communication history storage unit 103 in the first example embodiment of the present invention.

In the communication history information C illustrated in the format of a table in FIG. 3, a first row indicates a communication time. A second row indicates a terminal identifier of the information processing terminal 10. A third row indicates a terminal state determined by the terminal state determination unit 102. As the terminal state indicated in the third row, a state of the screen 107 of the information processing terminal 10 is stored, as an example.

In the following description, however, when it is necessary to distinguish and describe each of a terminal identifier, a communication time, and a terminal state indicated as a specific example in the second row and thereafter in FIG. 3 among pieces of information included in the communication history information C, it is assumed that these pieces of information are referred to a communication history.

More specifically, the following description is made with reference to the second row in FIG. 3. It is assumed that the second row in FIG. 3 indicates a communication history between the information processing terminal 10 and the application server 30. Referring to the second row, the communication history indicates that an information processing terminal 10-1 to be identified by a terminal identifier "10-1" performs communication with the application server 30 at a time "14:23:10 (at 2 o'clock p.m., twenty-three minutes, and ten seconds: hereinafter, the same indication of time is applied in the present application). Further, the communication history indicates that a terminal state of the information processing terminal 10-1 when the information processing terminal 10-1 performs communication with the application server 30 is that the screen 107 is determined to be "ON" (i.e. on-state).

In the present example embodiment, however, to simplify description, an example in which the communication history information C includes a terminal state, a communication time, and a terminal identifier is described, as an example. An example embodiment according to the present invention, however, is not limited to the aforementioned configuration. The communication history information C may employ a configuration including at least one of the following pieces of information.

An identifier (e.g. an IP address and a port number) capable of identifying the application server 30 which performs communication with the information processing terminal 10, a size (byte number) of data in communication performed between terminals, the number of sessions in a TCP being established by the information processing terminal 10, and a terminal state.

Herein, it is assumed that the terminal state indicates not only a state of the screen 107, but also at least one of a communication state accompanied by the aforementioned application, a communication state accompanied by a set of applications, and a moving state of the information processing terminal 10.

In the following description, an operation of the communication prediction unit 104 is described.

The communication prediction unit 104 predicts communication to be performed by the information processing terminal 10 during a time (period) from a target time until a time after lapse of a predetermined time, based on a terminal state of the information processing terminal 10 at the target time (point of time), and the communication history information C. Specifically, the communication prediction unit 104 predicts the communication, based on a current terminal state of the information processing time 10 determined by the terminal state determination unit 102, and the communication history information C stored in the communication history storage unit 103.

The communication to be predicted is, for example, whether or not the information processing terminal 10 performs certain communication during a period from a current time "T0" as a target time until a time "T1(T1>T0)" after lapse of a predetermined time. Further, for example, the target time may be not only a current time but also a time desired by a user (hereinafter, the same idea is applied to the respective example embodiments).

To simplify description, communication to be predicted is described by the aforementioned configuration as an example. The present invention to be described by the present example embodiment as an example, however, is not limited to the aforementioned configuration. For example, communication to be predicted may be a data size (data amount) of communication to be performed by the information processing terminal 10 during a period from a time "T0" until a time "T1", or may be a communication frequency.

In the following description, to simplify description, an operation in which the communication prediction unit 104 predicts communication to be performed by the information processing terminal 10-$k$ is described, as an example.

Further, it is assumed that the information processing terminal 10-$k$ completes communication at a time "T=0", and does not perform communication during a period "0<T<t" in a terminal state $S_k$. In other words, it is assumed that the information processing terminal 10-$k$ completes communication at a communication time "T=0" when the information processing terminal 10-$k$ performs communication most lately, and does not perform communication during a period from the communication time "T=0" until a time "t". It is assumed that the terminal state $S_k$ indicates a state of the screen 107. In this case, in the following description, it is assumed that the terminal state $S_k$ is a binary state i.e. a terminal state $S_k$=ON indicating an on-state of the screen 107, or a terminal state $S_k$=OFF indicating an off-state of the screen 107.

The communication prediction unit 104 refers to the communication history information C stored in the communication history storage unit 103. The communication prediction unit 104 calculates $p(t|S_k, k)\Delta t$, for each terminal state $S_k$, based on the referred communication history information C. Herein, $p(t|S_k, k)\Delta t$ indicates a probability with which the information processing terminal 10-$k$ does not perform communication during a period "0<T<t", and performs communication during a period "t≤T<(t+Δt)".

In the present example embodiment, it is assumed that $p(t|S_k$=ON, $k)\Delta t$ at a timing when the terminal state $S_k$=ON is calculated. Further, in the present example embodiment, it is assumed that $p(t|S_k$=OFF, $k)\Delta t$ at a timing when the terminal state $S_k$=OFF is calculated. Specifically, in the present example embodiment, it is assumed that p(t|$S_k$=OFF, k)Δt is calculated for each terminal state $S_k$.

In the following description, more specifically, processing when the communication prediction unit 104 calculates p(t|$S_k$=ON, k)Δt is described with reference to FIG. 4.

The communication prediction unit 104 extracts, from the communication history information C stored in the communication history storage unit 103, information in which a terminal identifier is "10-$k$" and the terminal state $S_k$ is "ON". Specifically, the communication prediction unit 104 extracts, from the communication history information C, information in which the terminal identifier "10-$k$" and the terminal state $S_k$"ON" are associated with each other. Herein, it is assumed that the extracted information includes at least a communication time, the terminal identifier 10-$k$, and the terminal state $S_k$.

The communication prediction unit 104 rearranges the extracted pieces of information in an ascending order, based on a communication time (i.e. in an order from old information to new information in terms of communication time). Further, the communication prediction unit 104 acquires a difference $g_m$, between a communication time associated with an m-th record (where m is a natural number), and a communication time associated with an (m+1)-th record among respective records constituting the communication history information C exemplified in FIG. 3, for example, from among the rearranged pieces of information. The communication prediction unit 104 generates a communication probability distribution graph (histogram) of the acquired communication time difference $g_m$. Further, the communication prediction unit 104 calculates p(t|$S_k$=ON, k)Δt by interpolating the generated histogram by a spline curve, for example.

Figure 4:
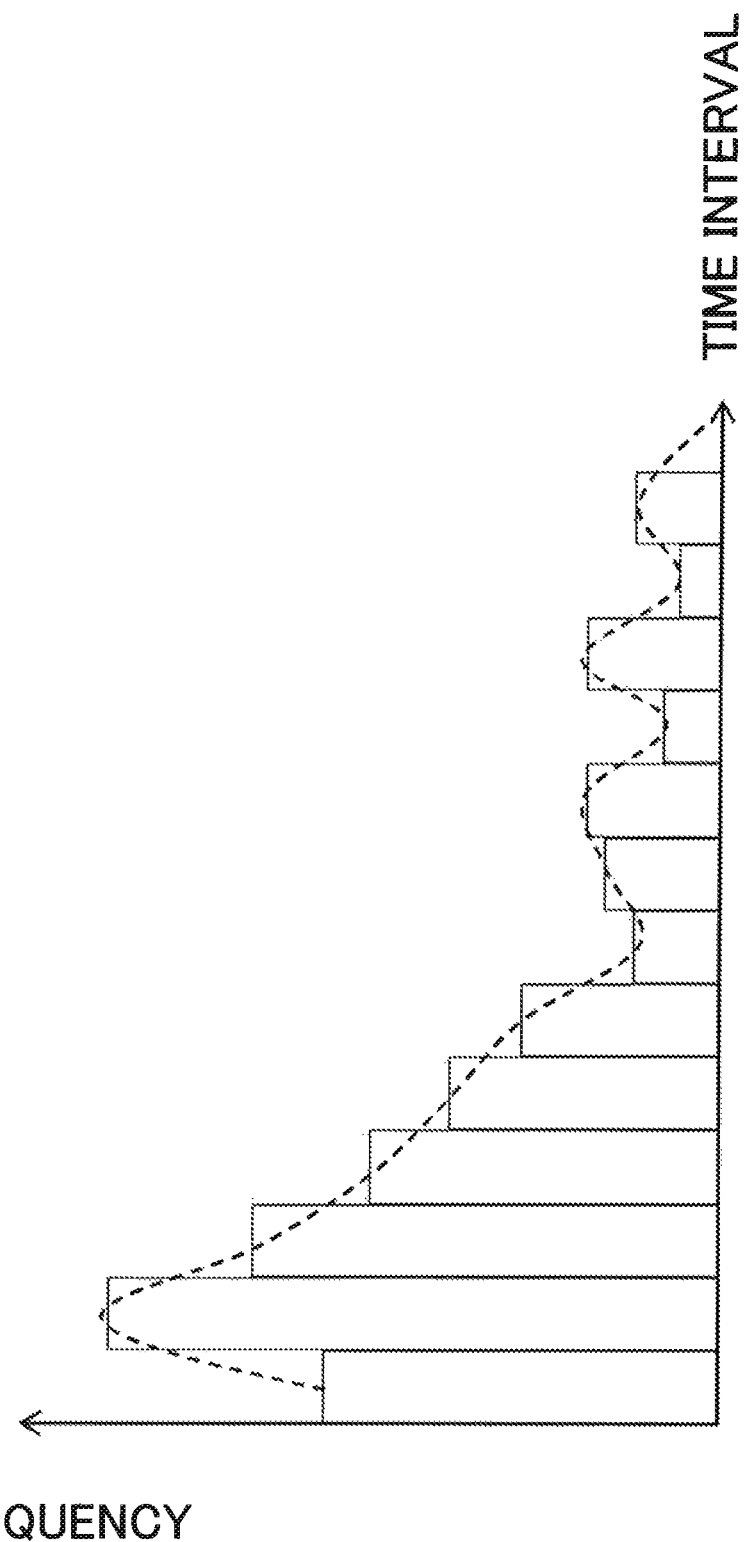
FIG. 4 is a diagram specifically exemplifying a communication probability distribution graph (histogram) generated by a communication prediction unit in the first example embodiment of the present invention.

FIG. 4 is a diagram specifically exemplifying a histogram generated by the communication prediction unit 104 in the first example embodiment of the present invention. In FIG. 4, a vertical axis indicates a frequency. A horizontal axis indicates a time interval. A curve indicated by a dotted line in FIG. 4 indicates p(t|$S_k$=ON, k)Δt acquired by interpolating a generated histogram by a spline curve.

In the aforementioned present example embodiment, to simplify description, an example of a configuration in which the communication prediction unit 104 acquires a probability with which the aforementioned communication is performed by the aforementioned calculation method is described, as an example. The present invention to be described by the present example embodiment as an example, however, is not limited to the aforementioned calculation method. For example, the communication prediction unit 104 may calculate a probability with which the communication is performed by an estimation method such as kernel density estimation using the difference $g_m$. By using the kernel density estimation, the communication prediction unit 104 is able to more smoothly acquire a distribution. Further, the communication prediction unit 104 is able to accurately acquire p(t|$S_k$=ON, k)Δt.

Further, as another calculation method, the communication prediction unit 104 may calculate p(t|$S_k$=ON, k)Δt by performing fitting of a parameter of a model function in the acquired p(t|$S_k$, k)Δt with use of the difference $g_m$. As the model function, a Pareto distribution, a Poisson distribution, a normal distribution, and a mixture distribution acquired by combining any of these distributions may be employed. Alternatively, as the model function, another distribution different from the aforementioned distributions may be used. By using the model function, the communication prediction unit 104 is able to accurately calculate p(t|$S_k$, k)Δt, even when the number of differences $g_m$ from which a parameter is acquired is small.

To simplify description, the aforementioned description is made by focusing on a case where a terminal state is an on-state ($S_k$=ON). Calculation is possible by the calculation method described above also when a terminal state is an off-state ($S_k$=OFF). Therefore, overlapping description is omitted.

In this way, the communication prediction unit 104 is able to acquire a probability with which the information processing terminal 10-$k$ does not perform communication during a period "0<T<t", and performs communication during a period "t≤T<(t+Δt)".

The communication prediction unit 104 acquires a current terminal state $S_k$ of the information processing terminal 10-$k$ from the terminal state determination unit 102. Specifically, the communication prediction unit 104 acquires the terminal state $S_k$ of the information processing terminal 10-$k$ determined by the terminal state determination unit 102 at a target time. The communication prediction unit 104, however, may receive the terminal state $S_k$ from the terminal state determination unit 102.

The communication prediction unit 104 refers to the communication history information C stored in the communication history storage unit 103. The communication prediction unit 104 acquires, from the communication history information C, a communication time when the information processing terminal 10-$k$ performs communication most lately. Specifically, the communication prediction unit 104 extracts a communication time closest to the target time, from among communication times associated with the terminal identifier "10-$k$" included in the communication history information C. In other words, the communication prediction unit 104 extracts a latest communication time from among communication times at which the information processing terminal 10-$k$ performs communication. The communication prediction unit 104 calculates a difference $G_k$ between an acquired communication time, and the target time (e.g. a current time) "T0".

The communication prediction unit 104 calculates a probability P(T1−T0|$S_k$, $G_k$, k) by the following Eq. (1) by using an acquired p(t|$S_k$, k)Δt, a terminal state $S_k$ at the target time, and a difference G. The probability P(T1−T0|$S_k$, $G_k$, k) is a probability with which the information processing terminal 10-$k$ does not perform communication during a period from a time "0" when the information processing terminal 10-$k$ performs communication most lately until a time "T0", and performs communication during a period from the time "T0" until a time "T1" after lapse of a predetermined time.

Herein, k is a natural number, and is equal to k in the terminal identifier indicated by "10-$k$". $G_k$ indicates a difference $G_k$ between a communication time "0" when the information processing terminal 10-$k$ performs communication most lately, and a current time "T0". A denominator on the right side of the mathematical expression (1) indicates a probability with which the information processing terminal 10-$k$ does not perform communication during a period from a time "0" when the information processing terminal 10-$k$ performs communication most lately until a difference $G_k$ (i.e. a current time). A numerator on the right side of the mathematical expression (1) indicates a probability with which the information processing terminal 10-$k$ performs communication during a period from a current time "T0" until a time "T1" after lapse of a predetermined time. Further, in the present application, to simplify description, a probability with which the information processing terminal 10 performs communication during a period from the time "T0" until the time "T1" after lapse of a predetermined time is also described as a communication probability.

The communication prediction unit 104 determines whether or not the acquired P(T1−T0|$S_k$, $G_k$, k) is equal to or larger than a predetermined condition (threshold value "Pth"). As a result of determination, when it is judged that the acquired P(T1−T0|$S_k$, $G_k$, k) is equal to or larger than the predetermined condition, the communication prediction unit 104 predicts that the information processing terminal 10-k performs communication during a period from the time "T0" until the time "T1". On the other hand, when it is judged that the acquired P(T1−T0|$S_k$, $G_k$, k) is smaller than the predetermined condition, the communication prediction unit 104 predicts that the information processing terminal 10-k does not perform communication during a period from the time "T0" until the time "T1".

In this way, the communication prediction unit 104 is able to predict communication to be performed by the information processing terminal 10.

In the following description, an operation example to be performed by the communication prediction apparatus 20 in the first example embodiment is described using FIG. 5 and FIG. 6.

Figure 5:
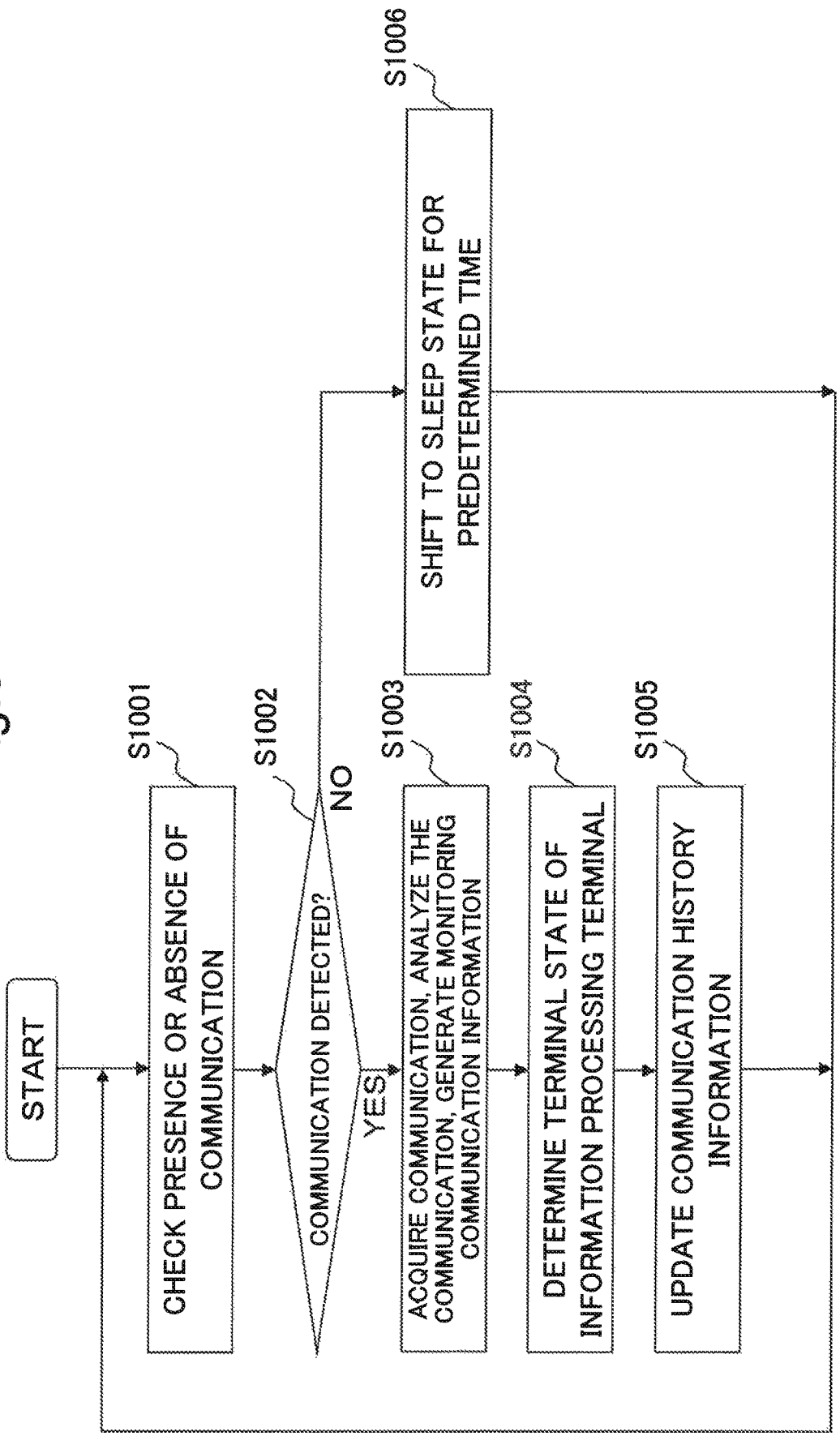
FIG. 5 is a flowchart illustrating an operation example in which the communication prediction apparatus in the first example embodiment of the present invention monitors communication by an information processing terminal, and stores communication history information including a monitoring result.

FIG. 5 is a flowchart illustrating an operation example in which the communication prediction apparatus 20 in the first example embodiment of the present invention monitors communication by the information processing terminal 10, and stores the communication history information C including a monitoring result. Further, FIG. 6 is a flowchart illustrating an operation example in which the communication prediction apparatus 20 in the first example embodiment of the present invention predicts communication to be performed by the information processing terminal 10-1, based on the communication history information C.

(Regarding Operation of Monitoring Communication, and Storing Communication History Information C Including Monitoring Result)

In the following description, to simplify description, it is assumed that the communication monitoring unit 101 monitors communication to be performed between the information processing terminal 10-1 and the application server 30, as an example.

In FIG. 5, the communication monitoring unit 101 of the communication prediction apparatus 20 checks presence or absence of communication to be performed between the information processing terminal 10-1 and the application server 30. Specifically, the communication monitoring unit 101 determines whether or not the communication is detected (Step S1001). When it is judged that communication is detected, the communication monitoring unit 101 proceeds processing to Step S1003 ("Yes" in Step S1002). On the other hand, when it is judged that communication is not detected, the communication monitoring unit 101 proceeds processing to Step S1006 ("No" in Step S1002).

When communication is present (i.e., communication is detected), the communication monitoring unit 101 acquires communication information in communication. The communication monitoring unit 101 analyzes a communication content of the detected communication, based on the acquired communication information. Further, the communication monitoring unit 101 generates the monitoring communication information M relating to the communication. The communication monitoring unit 101 notifies the terminal state determination unit 102 and the communication history storage unit 103 of the generated monitoring communication information M (Step S1003).

In the following description, it is assumed that the monitoring communication information M includes a terminal identifier of the information processing terminal 10-1, and a time (communication time) when the aforementioned communication is detected and communication information in the communication is acquired, as an example. More specifically, it is assumed that the monitoring communication information M includes the terminal identifier "10-1" of the information processing terminal 10-1, and the communication time "14:23:20", as an example.

The terminal state determination unit 102 of the communication prediction apparatus 20 determines a terminal state of the information processing terminal 10-1 (Step S1004).

In the following description, it is assumed that a state of the screen 107 of the information processing terminal 10-1 is determined as the terminal state, as an example. Further, it is assumed that the terminal state determination unit 102 determines that the state of the screen 107 is an on-state ($S_1$=ON).

The communication history storage unit 103 of the communication prediction apparatus 20 stores the following information, as the communication history information C in an associated state, and returns processing to Step S1001 (Step S1005).

Monitoring communication information M generated in processing illustrated in Step S1001 to Step S1003, and a terminal state of the information processing terminal 10-1 determined in processing illustrated in Step S1004.

In the following description, the communication history information C stored in the communication history storage unit 103 is described with reference to FIG. 7, as an example.

Figure 7:
FIG. 7 is a diagram specifically exemplifying the communication history information C stored in the communication history storage unit in the first example embodiment of the present invention.

FIG. 7 is a diagram specifically exemplifying the communication history information C stored in the communication history storage unit 103 in the first example embodiment of the present invention. A configuration of the communication history information C illustrated in FIG. 7, however, is similar to a configuration of the communication history information C illustrated in FIG. 3, and therefore, overlapping description is omitted.

As illustrated by a communication history 110 in FIG. 7, it is assumed that the communication history storage unit 103 adds (updates) the communication time "14:23:20", the terminal identifier "10-1", and the terminal state "$S_1$=ON" in a last (lowermost) row of the communication history information C indicated in the form of a table in an associated state.

The communication monitoring unit 101 determines whether or not communication to be performed between the information processing terminal 10-1 and the application server 30 is detected again (Step S1001 and Step S1002). When it is judged that communication is detected ("Yes" in Step S1002), the communication monitoring unit 101 repeats processing illustrated in Step S1003 to Step S1005.

On the other hand, as a result of determination in Step S1002, when communication is not detected (No in Step S1002), the communication monitoring unit 101 shifts to a sleep state for a predetermined time. In Step S1006, after lapse of the predetermined time, the communication monitoring unit 101 returns processing to Step S1001. Specifically, the communication monitoring unit 101 repeats processing of Step S1001 and thereafter again.

By the aforementioned operation illustrated in Steps S1001 to S1006, the communication prediction apparatus 20 is able to store the communication history information C relating to communication to be performed between the information processing terminal 10-1 and the application server 30.

(Regarding Operation of Predicting Communication)

In the following description, an operation example in which the communication prediction apparatus 20 predicts communication to be performed by the information processing terminal 10-1 is described using FIG. 6.

In the following description, to simplify description, it is assumed that the communication prediction apparatus 20 predicts whether or not the information processing terminal 10-1 to be identified by the terminal identifier "10-1" does not perform communication during a period from a time when the information processing terminal 10-1 performs communication most lately until a current time "T0", and performs communication during a period from the current time "T0" until a certain time "T1" in the future, as an example. Further, in the following description, a state of the screen 107 is used as a terminal state $S_1$ of the information processing terminal 10-1.

To simplify description, the communication prediction apparatus 20 is described by the aforementioned configuration as an example. The present invention to be described by the present example embodiment as an example, however, is not limited to the aforementioned configuration.

The communication prediction apparatus 20 starts prediction of communication to be performed by the information processing terminal 10-1 (Step S1101).

In the present example embodiment, for example, a timing at which the communication prediction apparatus 20 is requested to start prediction from another communication device (not illustrated) may be used, as a trigger by which communication prediction is started. Further, the communication prediction may be periodically performed. Alternatively, the communication prediction may be started by using, as a trigger, that the communication monitoring unit 101 detects communication performed by the information processing terminal 10-1 being a monitoring target.

The terminal state determination unit 102 of the communication prediction apparatus 20 determines a current terminal state of the information processing terminal 10-1. Specifically, the terminal state determination unit 102 newly determines a terminal state of the information processing terminal 10-1 at a target time (e.g. a current time) (Step S1102).

In the following description, it is assumed that the terminal state determination unit 102 determines that the screen 107 is in an on-state ($S_1$=ON) as a current terminal state.

The communication prediction unit 104 of the communication prediction apparatus 20 extracts, from the communication history information C stored in the communication history storage unit 103, information (communication history) necessary for predicting communication to be performed by the information processing terminal 10-1 (Step S1103).

More specifically, the communication prediction unit 104 refers to the communication history information C, based on a terminal state of the information processing terminal 10-1 determined by the terminal state determination unit 102. Further, the communication prediction unit 104 extracts, from the communication history information C, a communication history associated with a determination result in the past corresponding to a determined terminal state of the information processing terminal 10-1.

The communication prediction unit 104 calculates a probability $P1(T1-T0|S_1, G_1, k=1)$ with which the information processing terminal 10-1 does not perform communication during a period from a time when the information processing terminal 10-1 performs communication most lately until a time "T0", and performs communication during a period from the time "T0" until a time "T1" (Step S1104).

More specifically, the communication prediction unit 104 calculates $p(t|S_1, k=1)\Delta t$, based on the extracted information (communication history).

In the following description, since it is determined that an on-state ($S_1$=ON) of the screen 107 is a current terminal state, it is assumed that the communication prediction unit 104 calculates a probability $p(t|S_1$=ON, $k=1)\Delta t$.

The communication prediction unit 104 calculates a probability $P1(T1-T0|S_1, G_1, k=1)$ with which the information processing terminal 10-1 performs communication during a period from the time "T0" until the time "T1", based on the calculated $p(t|S_1$=ON, $k=1)\Delta t$ and by using Eq. (1).

In the following description, it is assumed that the calculated probability P1 is "0.9", as an example. Specifically, in the following description, it is assumed that the probability $P1(T1-T0|S_1, G_1, k=1)=0.9$.

In Step S1105, the communication prediction unit 104 determines whether or not the calculated probability P1 is equal to or larger than a predetermined threshold value (Pth). In other words, the communication prediction unit 104 compares the probability P1 and the predetermined threshold value. In the following description, it is assumed that Pth=0.7 as an example.

As a result of determination, when it is determined that the probability P1 is equal to or larger than the predetermined threshold value, the communication prediction unit 104 proceeds processing to Step S1107. Specifically, when $P1(T1-T0|S_1, G_1, k=1) \geq Pth$, the communication prediction unit 104 proceeds processing to Step S1107 ("Yes" in Step S1106).

On the other hand, when it is determined that the probability P1 is smaller than the predetermined threshold value, the communication prediction unit 104 proceeds processing to Step S1108. Specifically, when it is not determined that $P1(T1-T0|S_1, G_1, k=1) \geq Pth$, the communication prediction unit 104 proceeds processing to Step S1108 ("No" in Step S1106).

When the probability P1 is equal to or larger than the predetermined threshold value, the communication prediction unit 104 predicts that the information processing terminal 10-1 performs communication during a period from the time "T0" until the time "T1" (Step S1107).

When the probability P1 is smaller than the predetermined threshold value, the communication prediction unit 104 predicts that the information processing terminal 10-1 does not perform communication during a period from the time "T0" until the time "T1" (Step S1108).

In the present example embodiment, since $P1(T1-T0|S_1, G_1, k=1) \geq Pth$, the communication prediction unit 104 predicts that the information processing terminal 10-1 performs communication.

In the aforementioned present example embodiment, to simplify description, an example of a configuration in which the communication prediction unit 104 predicts whether or not the information processing terminal 10-1 performs communication during a period from the time "T0" until the time "T1" is described, as an example. An example embodiment according to the present invention, however, is not limited to the aforementioned configuration. For example, the communication prediction unit 104 may employ a configuration of predicting a communication amount (data amount) in communication to be performed between the information processing terminal 10 and the application server 30 during a period from the time "T0" until the time "T1". In this case, the communication history storage unit 103 is able to implement the aforementioned configuration by further storing a data size in the communication history information C as described above.

Thus, for example, when it is predicted that a communication amount increases, the application server 30 is able to increase a processing power in advance by using a technique such as a virtualization technique. Consequently, the communication system 50 is able to retain quality of experience of a user.

Nowadays, it is possible to employ a general technique, as a technique itself of increasing a processing power of the application server 30 by a virtualization technique. Therefore, detailed description in the present example embodiment is omitted.

In the aforementioned present example embodiment, to simplify description, an example in which a state of the screen 107 is used as the terminal state of the information processing terminal 10 is described, as an example. An example embodiment according to the present invention, however, is not limited to the aforementioned example. Another state may be used as the terminal state of the information processing terminal 10.

In this case, for example, a communication state accompanied by an on-going application displayed on the screen 107 (i.e. during display) provided on the information processing terminal 10 may be used as the terminal state. Thus, the communication prediction unit 104 is able to accurately predict communication to be performed by the information processing terminal 10, even when a communication trend changes by switching an on-going application displayed on the screen 107.

Further, as another example, a communication state accompanied by one or more on-going applications in the information processing terminal 10 may be used as the terminal state. For example, a specific application to be operated on a smartphone may perform regular communication. Herein, regular communication indicates communication having regularity such as communication to be performed periodically, and communication which occurs after lapse of a predetermined time from certain communication. When a plurality of applications perform communication regularly, various pieces of communication overlap one another. Therefore, it is difficult to find regularities of individual applications, when a communication history of the information processing terminal 10 as a whole is focused without distinguishing the applications. However, by using a communication state accompanied by an on-going application as the terminal state, the communication prediction apparatus 20 is able to easily extract regular communication for each application. Consequently, the communication prediction unit 104 is able to accurately predict regular communication for each application, even when a plurality of applications perform regular communication.

Further, as another example, a moving speed of the information processing terminal 10 may be used as the terminal state, for example. Thus, the communication prediction unit 104 is able to enhance prediction accuracy of communication to be performed by the information processing terminal 10. A reason for this is that a user tends to use the information processing terminal 10 in a train, when the user carrying the information processing terminal 10 is moving while riding on the train, for example. Specifically, a communication frequency of the information processing terminal 10 may rapidly increase. Therefore, by using a mobile state as the terminal state, the communication prediction unit 104 is able to accurately predict communication to be performed by the information processing terminal 10, even when the communication frequency greatly changes.

As another example, at least one of a position indicating a location of the information processing terminal 10, and a date and time may be used as the terminal state, for example. Thus, for example, when the information processing terminal 10 exhibits a different communication trend depending on a specific location or a specific date and time, the communication prediction unit 104 is able to enhance prediction accuracy of communication to be performed by the information processing terminal 10.

Alternatively, any terminal states may be combined and used among the aforementioned terminal states, as the terminal state. Thus, the communication prediction apparatus 20 is able to consider a communication trend, which changes depending on a combined terminal state, even when the terminal state of the information processing terminal 10 is the combined state.

In this way, in the communication prediction apparatus 20 according to the present example embodiment, it is possible to more accurately predict communication to be performed by a target terminal, even when a communication trend changes accompanied by a change in state of the target terminal. A reason for this is as follows.

Specifically, the communication prediction apparatus 20 includes the communication monitoring unit 101, the terminal state determination unit 102, the communication history storage unit 103, and the communication prediction unit 104. More specifically, in the communication prediction apparatus 20 having the aforementioned device configuration, the communication monitoring unit 101 monitors communication to be performed by the information processing terminal 10 being a monitoring target. Then, the communication monitoring unit 101 generates the monitoring communication information M including information relating to communication as the monitoring result. The terminal state determination unit 102 determines a terminal state of the information processing terminal 10, based on the monitoring communication information M. The communication history storage unit 103 stores, in the communication history information C, a state that the monitoring communication information M acquired from the communication monitoring unit 101, and a determination result by the terminal state determination unit 102 are associated with each other, as a communication history. The communication prediction unit 104 is able to predict communication to be performed by the information processing terminal 10 during a period from a current time until a time after lapse of a predetermined time, based on the communication history information C and a current terminal state of the information processing terminal 10 determined by the terminal state determination unit 102.

Second Example Embodiment

Next, a second example embodiment based on the communication prediction apparatus 20 according to the aforementioned first example embodiment of the present invention is described. In the following description, features according to the present example embodiment are mainly described. In this case, overlapping description on similar components to the aforementioned example embodiment is omitted by assigning same reference numbers to the elements.

A communication prediction apparatus 21 in the second example embodiment of the present invention is described with reference to FIG. 8 to FIG. 10.

Figure 8:
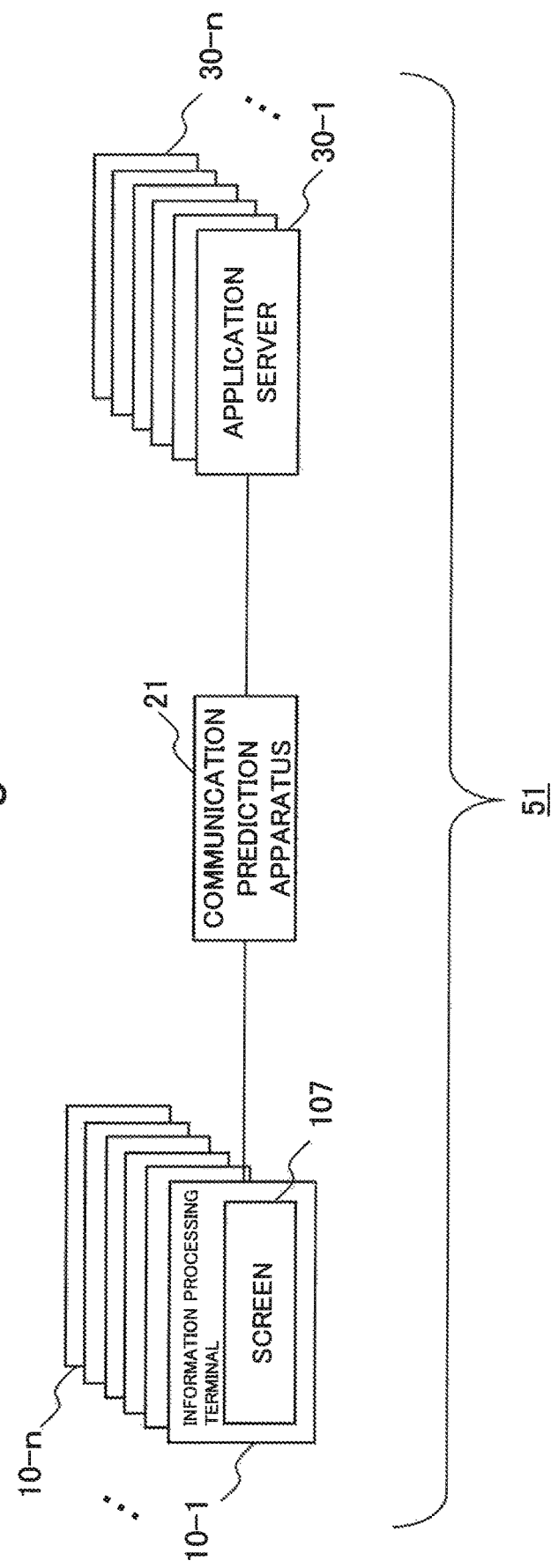
FIG. 8 is a block diagram illustrating a configuration of a communication system including a communication prediction apparatus in a second example embodiment of the present invention.
Figure 9:
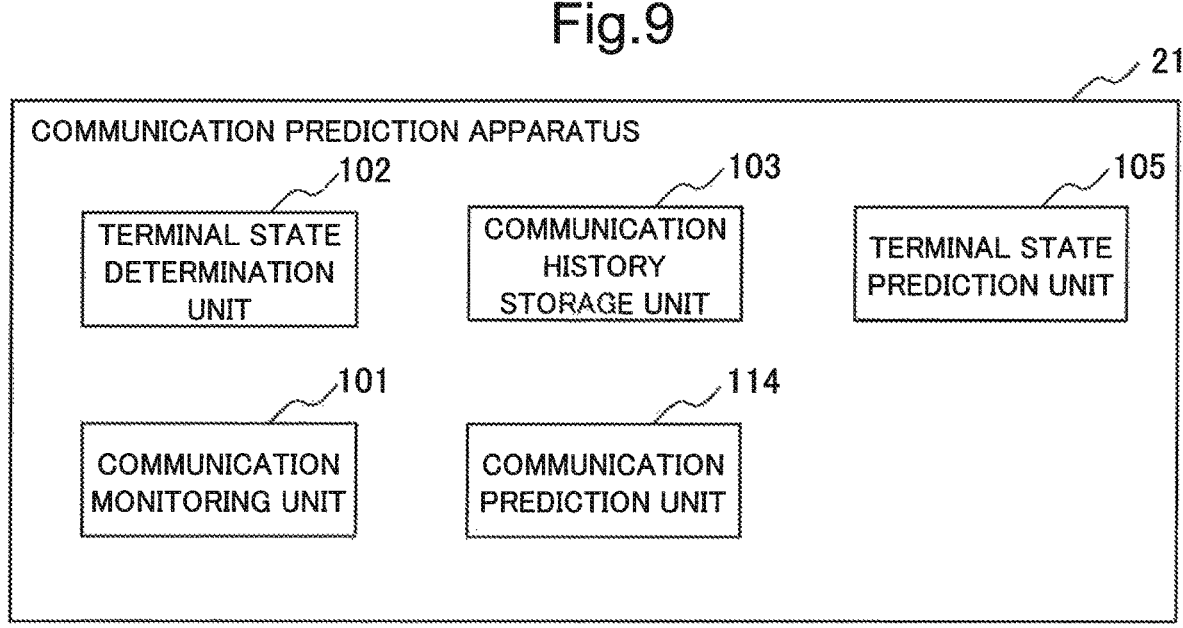
FIG. 9 is a block diagram illustrating a configuration of the communication prediction apparatus in the second example embodiment of the present invention.

FIG. 8 is a block diagram illustrating a configuration of a communication system 51 including the communication prediction apparatus 21 in the second example embodiment of the present invention. Further, FIG. 9 is a block diagram illustrating a configuration of the communication prediction apparatus 21 in the second example embodiment of the present invention.

In FIG. 8, the communication system 51 substantially includes one or more information processing terminals 10, the communication prediction apparatus 21, and one or more application servers 30. Further, the information processing terminal 10 includes a screen 107. In FIG. 9, the communication prediction apparatus 21 includes a communication monitoring unit 101, a terminal state determination unit 102, a communication history storage unit 103, a communication prediction unit 114, and a terminal state prediction unit 105.

An example is described in which the communication prediction apparatus 20 described in the first example embodiment predicts communication to be performed by the information processing terminal 10, based on the communication history information C including a communication history of the information processing terminal 10 being a target for communication prediction, and a current terminal state of the information processing terminal 10. The communication prediction apparatus 21 to be described in the present example embodiment is different from the communication prediction apparatus 20 in a configuration that the aforementioned communication is predicted, further taking into consideration a terminal state of the information processing terminal 10 in the future, in addition to the communication history information C and a current terminal state of the information processing terminal 10. Further, the communication prediction apparatus 21 is different from the communication prediction apparatus 20 in a configuration that the terminal state prediction unit 105 is provided, and in a configuration that the communication prediction unit 114 is provided in place of the communication prediction unit 104 described in the first example embodiment.

In view of the above, the following description is made by focusing on the terminal state prediction unit 105 and the communication prediction unit 114.

The terminal state prediction unit 105 predicts a terminal state of the information processing terminal 10 in the future, based on at least one of terminal state history information to be described later (hereinafter, also simply referred to as "state history information") and the communication history information C. Specifically, the terminal state prediction unit 105 acquires a probability value (prediction value) with which a terminal state of the information processing terminal 10 changes at a time after lapse of a predetermined time from a current time as a target time.

More specifically, in the following description, a prediction method for predicting a terminal state of the information processing terminal 10 by the terminal state prediction unit 105 is described.

In the present example embodiment, to simplify description, it is assumed that the terminal state predication unit 105 calculates a probability $p_{s1 \to s2}(t)$, as a prediction value, with which a state of the information processing terminal 10 changes from a terminal state S1 to a terminal state S2 during a period from a time "t" until a time "t+Δt", as an example. The terminal state S1 and the terminal state S2 respectively indicate different terminal states.

Further, in the following description, it is assumed that the time "t=0" indicates a current time. Further, it is assumed that a state of the information processing terminal 10 during a period from the time "t=0" until the time "t" is the terminal state S1.

It is assumed that the terminal state prediction unit 105 predicts a state of the screen 107 provided on the information processing terminal 10 as the terminal state. Specifically, in the following description, a method for calculating a probability $p_{ON \to OFF}(t)$ with which the screen 107 changes from an on-state to an off-state is described, as an example. However, the terminal state prediction unit 105 is also able to calculate a probability $p_{OFF \to ON}(t)$ with which the screen 107 changes from an off-state to an on-state.

The terminal state prediction unit 105 calculates a probability with which a terminal state of the information processing terminal 10 changes for the purpose of predicting the terminal state. Specifically, the terminal state prediction unit 105 calculates a changing probability $p_{ON \to OFF}(t)$ by the following Eq. (2).

$$p_{ON \to OFF}(t) = \lambda_{OFF} \exp(-\lambda_{OFF} t) \qquad (2)$$

Herein, it is assumed that a probability (rate of change) with which a state of the screen 107 as a terminal state changes from an on-state (S=ON) to an off-state (S=OFF) is $\lambda_{OFF}$. Further, in the following description, it is assumed that a rate of change with which a state of the screen 107 changes from an off-state (S=OFF) to an on-state (S=ON) is $\lambda_{ON}$. Further, a probability with which a state of the screen 107 changes from an on-state (S=ON) to an off-state (S=OFF) at a minute time Δt is described as $\lambda_{OFF} t\Delta$. Exp indicates an exponential function.

It is possible to acquire the rate of change by an inverse number of an average duration indicating an average of times (durations) during which a specific terminal state S is continued. More specifically, the rate of change $\lambda_{OFF}$ is calculated by an inverse number of an average duration of an on-state (S=ON). Further, the rate of change $\lambda_{ON}$ is calculated by an inverse number of an average duration of an off-state (S=OFF). These durations of the terminal state S may be acquired by the following method, for example. Specifically, the terminal state determination unit 102 chronologically records information indicating a change in terminal state S of the information processing terminal 10, and a date and time including a time when the terminal state S changes in an associated state, as state history information. Further, the terminal state determination unit 102 calculates a difference between a start date and time and an end date and time of a specific terminal state S (e.g. S=ON), based on the stored information, and acquires an average duration by calculating an average value of the calculated differences. It is assumed that the terminal state prediction unit 105 acquires a rate of change, based on an average duration acquired by the terminal state determination unit 102.

The present invention to be described by the present example embodiment as an example, however, is not limited to the aforementioned configuration. The terminal state prediction unit 105 may acquire a duration of the terminal state S, based on the communication history information C. Specifically, the terminal state prediction unit 105 calculates a difference between a start date and time and an end date and time of the specific terminal state S (e.g. S=ON) included in the communication history information C, and acquires an average duration by calculating an average value of the calculated differences. The terminal state prediction unit 105 may acquire a rate of change, based on the acquired average duration.

The present invention to be described by the present example embodiment as an example, however, is not limited to the aforementioned calculation method. For example, the terminal state prediction unit 105 may calculate a probability with which a terminal state changes by using a method such as a Markov chain.

Further, in the present example embodiment, an example in which a state of the screen 107 is used as a terminal state of the information processing terminal 10 is described. An example embodiment according to the present invention, however, is not limited to the aforementioned example. As a terminal state, for example, various terminal states described in the first example embodiment such as a communication state accompanied by an on-going application displayed on the screen 107 may be used.

The communication prediction unit 114 predicts, based on following information, that the information processing terminal 10 does not perform communication during a period from a time when the information processing terminal 10 performs communication most lately until a target time, and performs communication during a time (period) from the target time until a time after lapse of a predetermined time.

Communication history information C stored in the communication history storage unit 103,
a terminal state of the information processing terminal 10 at a target time (current time) determined by the terminal state determination unit 102, and
a terminal state (prediction value) at a time after lapse of a predetermined time from a target time predicted by the terminal state prediction unit 105.

More specifically, in the following description, a method in which the communication prediction unit 114 predicts communication to be performed by the information processing terminal 10 is described.

In the following description, to simplify description, it is assumed that the communication prediction unit 114 predicts communication to be performed by the information processing terminal 10-$k$ identified by the terminal identifier "10-$k$". Specifically, the communication prediction unit 114 calculates a probability $P(T1|G_k, k)$ with which the information processing terminal 10-$k$ performs communication during a period from a current time "t=0" as a target time until a predetermined time "t=T1" after the current time.

In this case, in the following description, it is assumed that, at a current time "t=0", a time $G_k$ elapses from a timing at which the information processing terminal 10-$k$ performs communication most lately. Specifically, in the following description, the information processing terminal 10-$k$ does not perform communication during a period from a time (i.e. t=$-G_k$) when the information processing terminal 10-$k$ performs communication most lately until the current time "t=0", and performs communication during a period from the current time "t=0" until a predetermined time "t=T1" after the current time. Further, it is assumed that a state of the screen 107 is used as the terminal state S. In this case, in the following description, it is assumed that the terminal state S may be a binary state i.e. a terminal state S=ON indicating an on-state of the screen 107, or a terminal state S=OFF indicating an off-state of the screen 107.

The communication prediction unit 114 calculates a probability $p(t|S_k, k)\Delta t$ with which the information processing terminal 10-$k$ performs communication by using a communication history of the information processing terminal 10-$k$ included in the communication history information C stored in the communication history storage unit 103. Specifically, the communication prediction unit 114 calculates the probability $p(t|S_k, k)\Delta t$ with which the information processing terminal 10-$k$ performs communication, for each terminal state, based on the communication history information C.

A method for calculating the probability $p(t|S_k, k)\Delta t$ is similar to the method for calculating the probability p described in the first example embodiment. Therefore, overlapping description is omitted.

Herein, it is assumed that a terminal state of the information processing terminal 10-$k$ determined by the terminal state determination unit 102 is an on-state (S=ON) of the screen 107. Further, it is assumed that a probability value (prediction value) indicating a terminal state of the information processing terminal 10-$k$ predicted by the terminal state prediction unit 105 is $p_{ON \rightarrow OFF}(t|k)$. It is assumed that a terminal state of the information processing terminal 10-$k$ is an on-state (S=ON) of the screen 107 at a current time t=0.

It is possible to acquire a probability $p(t|Sk=ON, k)\Delta t$ with which the information processing terminal 10-$k$ performs communication during a period when a state of the screen 107 changes from an on-state (S=ON) to an off-state (S=OFF). In other words, it is possible to acquire a probability $p(t|Sk=ON, k)\Delta t$ with which the information processing terminal 10-$k$ performs communication during a period from a current time "t=0" being an on-state (S=ON) until a time "t" when a state of the screen 107 changes to an off-state (S=OFF). Further, it is possible to acquire a probability $p(t|Sk=OFF, k)\Delta t$ with which the information processing terminal 10-$k$ performs communication during a period from a time when a state of the screen 107 changes to an off-state (S=OFF) until a predetermined time "t=T1". Thus, it is possible to acquire a rate of change with which the terminal state $S_k$ changes from an on-state (S=ON) to an off-state (S=OFF) during a period from the current time "t=0" until the time "t=T1" by using these acquired probabilities. The communication prediction unit 114 calculates a probability $P(T1|G_k, k)$ with which the information processing terminal 10-$k$ performs communication, based on an acquired rate of change, and a probability with which the information processing terminal 10-$k$ does not perform communication during a period from a timing (time) when the information processing terminal 10-$k$ performs communication most lately until a current time. Specifically, the communication prediction unit 114 calculates the probability $P(T1|G_k, k)$ with which the information processing terminal 10-$k$ does not perform communication during a period from a time when the information processing terminal 10-$k$ performs communication most lately until a current time "t=0", and performs communication during a period from the current time "t=0" until a time "t=T1" by using the following Eq. (3).

The communication prediction unit 114 determines whether or not the acquired $P(T1|G_k, k)$ is equal to or larger than a predetermined condition (threshold value "Pth"). The communication prediction unit 114 is able to predict communication to be performed by the information processing terminal 10 depending on the determination result. In this way, the communication prediction unit 114 is able to predict communication to be performed by the information processing terminal 10, based on the communication history information C, a current terminal state of the information processing terminal 10, and a predicted terminal state of the information processing terminal 10.

In the following description, an operation example to be performed by the communication prediction apparatus 21 in the second example embodiment is described using FIG. 10.

Figure 10:
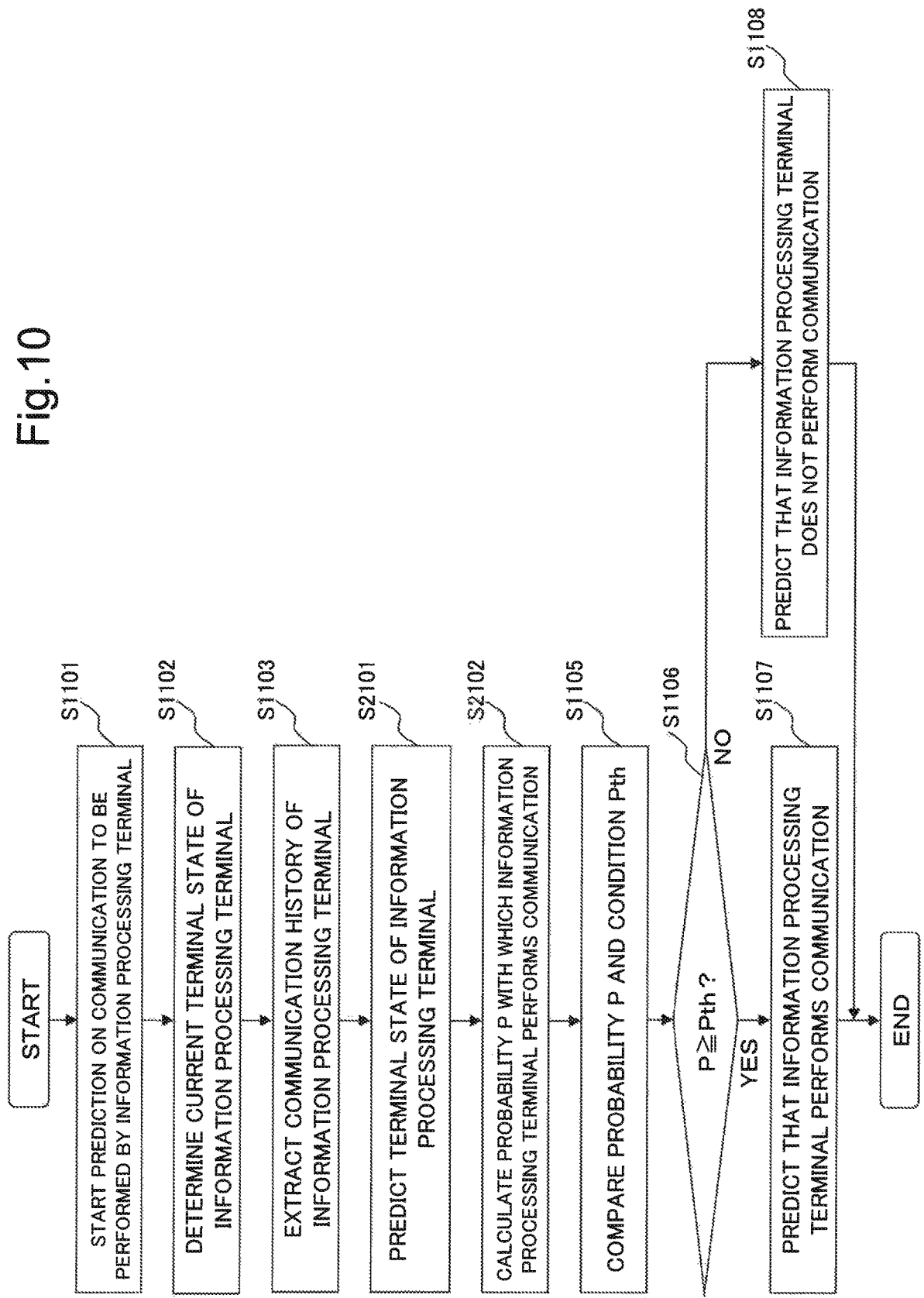
FIG. 10 is a flowchart illustrating an operation example in which the communication prediction apparatus in the second example embodiment of the present invention predicts communication to be performed by an information processing terminal.

FIG. 10 is a flowchart illustrating an operation example in which the communication prediction apparatus 21 in the second example embodiment of the present invention predicts communication to be performed by the information processing terminal 10. An operation procedure of the communication prediction apparatus 21 is described in accordance with the aforementioned flowchart.

Figure 6:
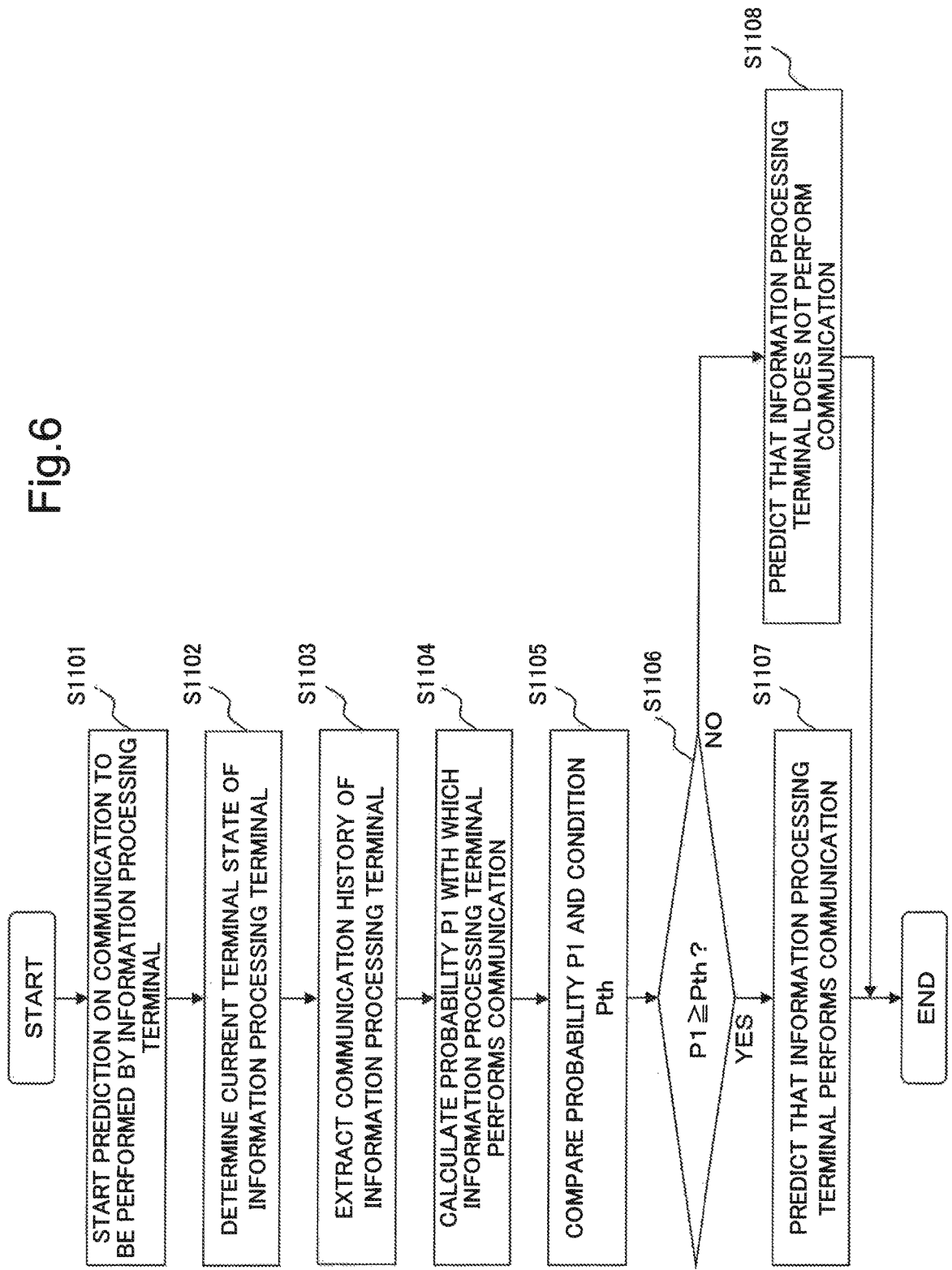
FIG. 6 is a flowchart illustrating an operation example in which the communication prediction apparatus in the first example embodiment of the present invention predicts communication to be performed by an information processing terminal, based on communication history information.

Regarding same processing as the operation example (Step S1101 to Step S1103, Step S1105 to Step S1108) described in the first example embodiment with reference to FIG. 6, overlapping description is omitted by assigning same reference numbers to the same processing. Specifically, the following description is made by focusing on processing illustrated in Step S2101 and Step S2102, which is different from the configuration described in the first example embodiment.

In the present example embodiment, in the following description, it is assumed that it is predicted whether or not the information processing terminal 10-1 identified by the terminal identifier "10-1" performs communication during a period from a current time "T0" until a certain time "T1" in the future after the current time "T0". Further, in the following description, it is assumed that a state of the screen 107 provided on the information processing terminal 10-1 is used as a terminal state.

The terminal state prediction unit 105 predicts a terminal state of the information processing terminal 10-1 by using a communication history of the information processing terminal 10-1 acquired by processing illustrated in Step S1103 (Step S2101).

More specifically, the terminal state prediction unit 105 calculates an average duration of an on-state (S=ON) of the screen 107 by using a communication history of the information processing terminal 10-1. Then, the terminal state prediction unit 105 calculates a rate of change $\lambda_{OFF}$ with which a terminal state changes from an on-state (S=ON) to an off-state (S=OFF), based on the calculated average duration. The terminal state prediction unit 105 calculates a probability $p_{ON \to OFF}(t)$ as a prediction value of a terminal state of the information processing terminal 10-1 by using the calculated rate of change $\lambda_{OFF}$ and Eq. (2).

The communication prediction unit 114 calculates a probability $P(T1|G_k, k=1)$ with which the information processing terminal 10-1 performs communication during a period from a current time "T0" until a time "T1" by using a communication history of the information processing terminal 10-1, and the prediction value calculated in Step S2101, based on the aforementioned Eq. (3) (Step S2102).

Further, the communication prediction unit 114 performs processing illustrated in Step S1105 to Step S1108 illustrated in FIG. 10 by using the calculated $P(T1|G_k, k=1)$. Thus, the communication prediction unit 114 is able to determine whether or not the information processing terminal 10-1 performs communication during a period from the current time "T0" until the time "T1".

In this way, in the communication prediction apparatus 21 according to the present example embodiment, it is possible to provide the advantageous effects described in the first example embodiment, and further predict communication to be performed by the information processing terminal 10 more accurately.

A reason for this is that the communication prediction apparatus 21 is able to predict the aforementioned communication, taking into consideration the communication history information C, a current terminal state of the information processing terminal 10, and a terminal state of the information processing terminal 10 in the future. Specifically, the communication prediction apparatus 21 further includes the terminal state prediction unit 105 for predicting a terminal state at a time after lapse of a predetermined time from a target time. Further, the communication prediction unit 114 described in the present example embodiment is able to predict the communication, based on a prediction result by the terminal state prediction unit 105, the communication history information C, and a current terminal state of the information processing terminal 10.

Generally, a terminal state of the information processing terminal 10 is not fixed in terms of time, and changes every moment. Further, since a communication trend of the information processing terminal 10 depends on a terminal state, the communication trend of the information processing terminal 10 also changes every moment. Therefore, the communication prediction apparatus 21 described in the present example embodiment is further able to predict a change in terminal state of the information processing terminal 10. Further, the communication prediction apparatus 21 is able to more accurately predict communication to be performed by the information processing terminal 10 by taking into consideration the predicted change in terminal state.

Third Example Embodiment

Next, a third example embodiment based on the communication prediction apparatus 21 according to the aforementioned second example embodiment of the present invention is described. In the following description, features according to the present example embodiment are mainly described. In this case, overlapping description on similar components to the aforementioned respective example embodiments is omitted by assigning same reference numbers to the elements.

A communication prediction apparatus 22 in the third example embodiment of the present invention is described with reference to FIG. 11 to FIG. 13.

Figure 11:
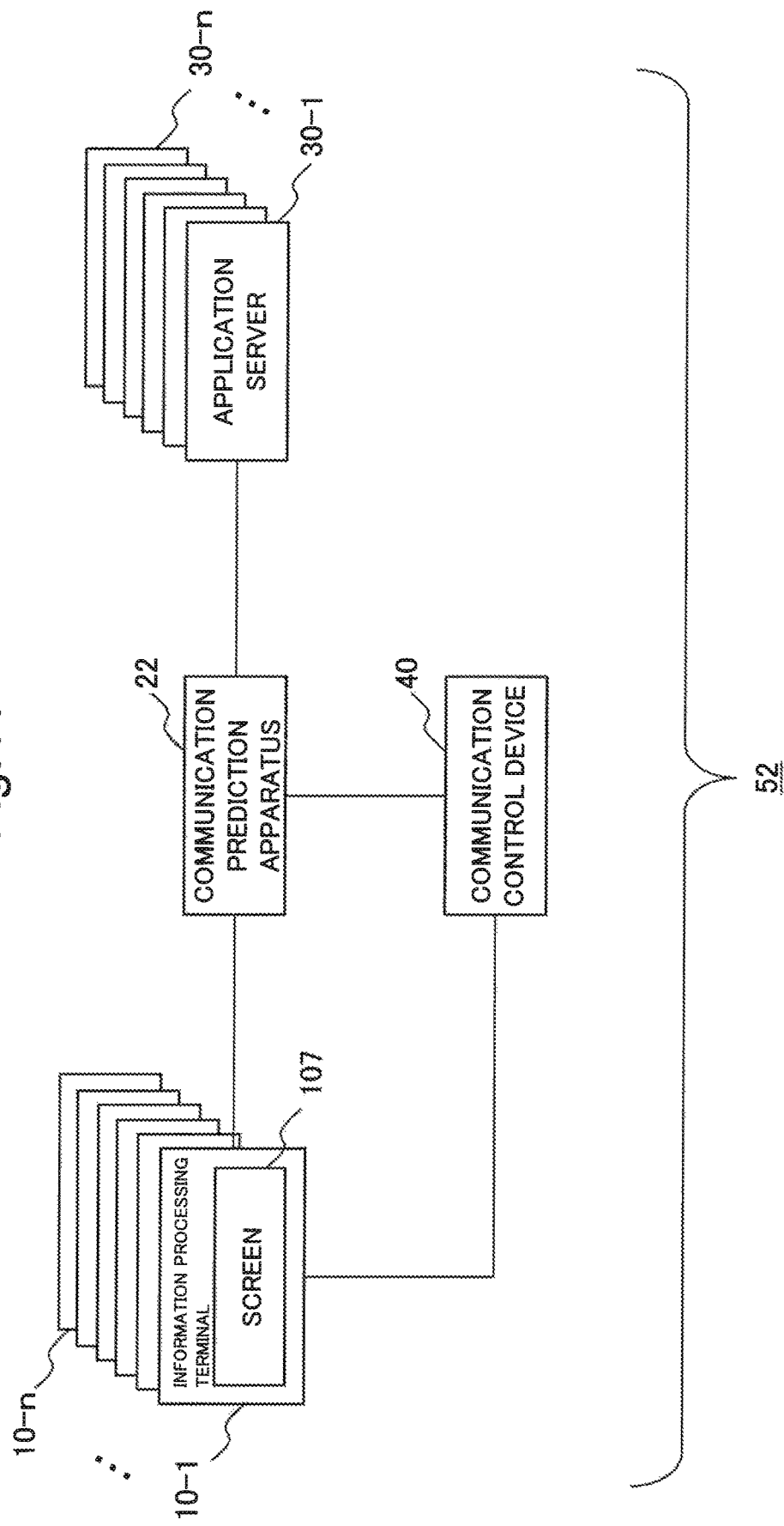
FIG. 11 is a block diagram illustrating a configuration of a communication system including a communication prediction apparatus in a third example embodiment of the present invention.
Figure 12:
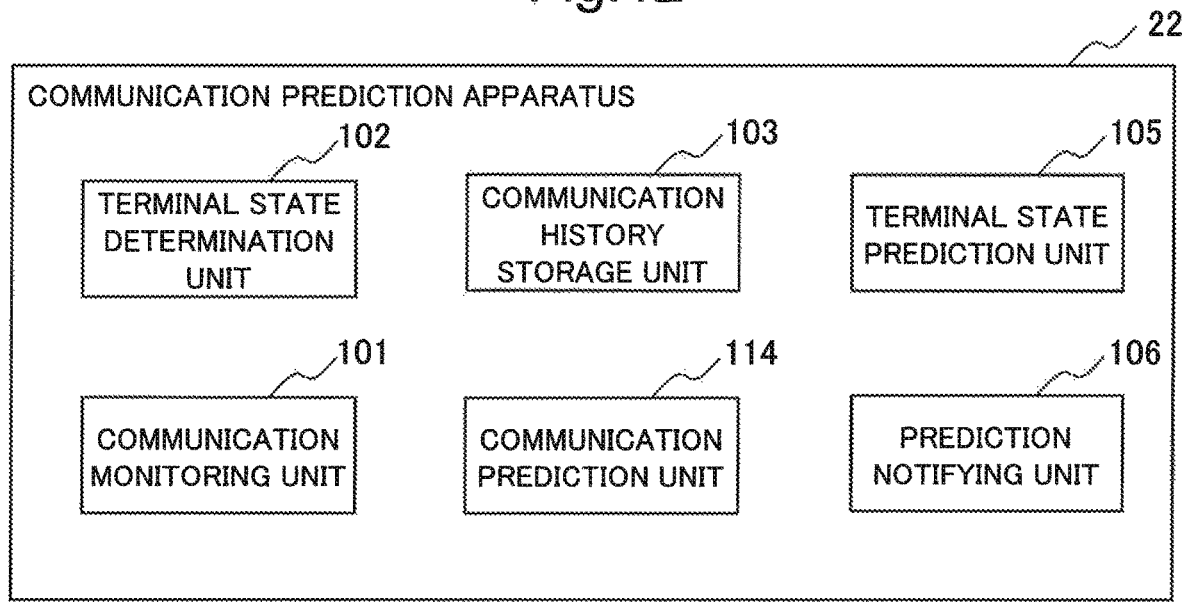
FIG. 12 is a block diagram illustrating a configuration of the communication prediction apparatus in the third example embodiment of the present invention.

FIG. 11 is a block diagram illustrating a configuration of a communication system 52 including the communication prediction apparatus 22 in the third example embodiment of the present invention. Further, FIG. 12 is a block diagram illustrating a configuration of the communication prediction apparatus 22 in the third example embodiment of the present invention.

In FIG. 11, the communication system 52 substantially includes one or more information processing terminals 10, the communication prediction apparatus 22, one or more application servers 30, and a communication control device 40. Further, the information processing terminal 10 includes a screen 107. In FIG. 12, the communication prediction apparatus 22 includes a communication monitoring unit 101, a terminal state determination unit 102, a communication history storage unit 103, a communication prediction unit 114, a terminal state prediction unit 105, and a prediction notifying unit 106.

The communication system 52 described in the present example embodiment is different from the communication system 51 in a configuration that the communication control device 40 is further provided. Further, the communication prediction apparatus 22 is different from the communication prediction apparatus 21 in a configuration that the prediction notifying unit 106 is further provided. Specifically, the communication prediction apparatus 22 is different from the communication prediction apparatus 21 in a configuration that the communication prediction apparatus 22 not only predicts communication to be performed by the information processing terminal 10 but also notifies another device (e.g. the communication control device 40) different from an own device (communication prediction apparatus 22) of the prediction result. Therefore, in the following description, description is made by focusing on the communication control device 40 and the prediction notifying unit 106.

More specifically, the communication control device 40 performs control relating to communication to be performed by the information processing terminal 10. Control relating to communication is, for example, control relating to request processing (wireless connection request processing) of requesting wireless connection to be performed between the information processing terminal 10 and a mobile network, suppression control of a handover, allocation control of a wireless resource to the information processing terminal 10, and the like.

The communication control device 40 may be applied to various types of devices constituting a mobile network in the mobile network using an LTE, for example. Specifically, the communication control device 40 may be a wireless base station (eNB: Evolved Node B). Further, the communication control device 40 may be a mobility management entity (MME). Alternatively, the communication control device 40 may be a policy and charging rule function (PCRF).

As described in the respective example embodiments, the communication prediction apparatus 22 predicts communication to be performed by the information processing terminal 10. Then, the communication prediction apparatus 22 transmits a result of the prediction (prediction result) to the communication control device 40.

The communication prediction apparatus 22 may be applied to a serving gateway (S-GW) constituting a mobile network, for example. Further, the communication prediction apparatus 22 may be applied to a packet data network gateway (P-GW). Alternatively, the communication prediction apparatus 22 may be another device capable of relaying communication between the information processing terminal 10 and the application server 30.

The prediction notifying unit 106 notifies the communication control device 40 of information (prediction result information) indicating a prediction result acquired from the communication prediction unit 114.

Herein, it is assumed that the prediction result information includes at least information indicating a terminal identifier capable of identifying the information processing terminal 10, a time (time interval), and a probability (communication probability) with which the information processing terminal 10 performs communication during a period from a current time until a time after lapse of the time, for example.

More specifically, in the following description, a case is described in which information "terminal identifier, time, communication probability" included in prediction result information is "10-1, 5000, 0.9", as an example. Specifically, the prediction result information indicates that a probability with which communication is performed by the information processing terminal 10-1 to be identified by the terminal identifier "10-1" during a period from a current time until a time after lapse of 5000 milliseconds is 0.9.

The communication control device 40 is able to perform communication control depending on a probability value by acquiring a prediction result by the probability value. For example, in the following description, a probability with which the information processing terminals 10-1 and 10-2 perform communication during a period from a current time until a time after lapse of 5000 milliseconds is assumed as follows. Specifically, it is assumed that a probability with which the information processing terminal 10-1 performs communication is 0.9. Further, it is assumed that a probability with which the information processing terminal 10-2 performs communication is 0.6. In the aforementioned assumption, when the probabilities of the both terminals are compared, the probability with which the information processing terminal 10-1 performs communication is high, as compared with the information processing terminal 10-2. Therefore, for example, the communication control device 40 is able to preferentially perform handover processing with respect to the information processing terminal 10-1.

Further, in the aforementioned assumption, when it is determined whether or not communication is performed by using a predetermined threshold value (e.g. Pth=0.6), it is determined that both of the information processing terminal 10-1 and the information processing terminal 10-2 perform communication. Therefore, when a probability value is not included in prediction result information, the communication control device 40 is not able to determine to which one of the two terminals, handover processing is to be preferentially performed. However, by notifying prediction result information including a probability value from the prediction notifying unit 106, the communication control device 40 is able to determine that the information processing terminal 10-1 is preferentially used, based on the probability value. In this way, placing a priority depending on a probability value is advantageous in acquiring an effect on priority control.

In the aforementioned present example embodiment, to simplify description, an example of a configuration in which the prediction notifying unit 106 notifies the communication control device 40 of prediction result information including a terminal identifier, a time (time interval), and a communication probability is described, as an example. An example embodiment according to the present invention, however, is not limited to the aforementioned configuration. A configuration in which the prediction notifying unit 106 notifies the communication control device 40 of prediction result information including information indicating a data amount (communication amount) in communication which is predicted to be performed by the information processing terminal 10, in place of a probability value indicating a communication probability may be employed. Thus, the communication control device 40 is able to perform control depending on a data amount to be predicted.

Further, a configuration in which the prediction notifying unit 106 notifies the communication control device 40 of prediction result information including only information (e.g. flag information) indicating whether or not the information processing terminal 10 performs communication, in place of the aforementioned probability value may be employed. This is advantageous for the prediction notifying unit 106 to suppress an amount of information to be notified to the communication control device 40.

In the following description, an operation example to be performed by the communication prediction apparatus 22 in the third example embodiment is described using FIG. 13.

Figure 13:
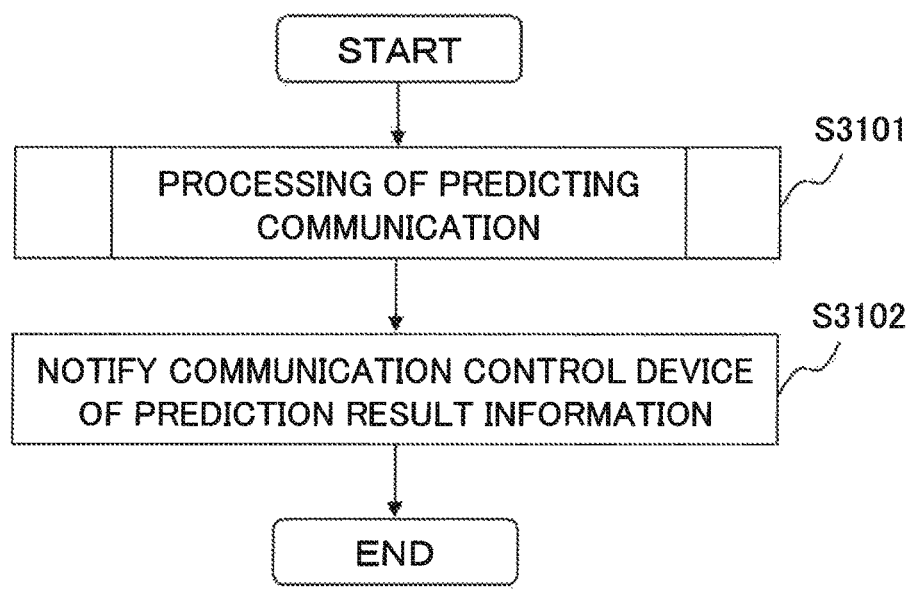
FIG. 13 is a flowchart illustrating an operation example in which the communication prediction apparatus in the third example embodiment of the present invention notifies a communication control device of a prediction result on communication to be performed by an information processing terminal.

FIG. 13 is a flowchart illustrating an operation example in which the communication prediction apparatus 22 in the third example embodiment of the present invention notifies the communication control device 40 of a prediction result on communication to be performed by the information processing terminal 10. An operation procedure of the communication prediction apparatus 22 is described in accordance with the aforementioned flowchart.

In the following description, to simplify description, it is assumed that the communication prediction apparatus 22 is mounted in the aforementioned S-GW, as an example.

The communication prediction apparatus 22 performs processing of predicting communication to be performed by the information processing terminal 10. Specifically, the communication prediction apparatus 22 starts processing of predicting the communication (Step S3101). Processing of predicting communication, however, is similar to the processing described in the first and second example embodiments with reference to FIG. 6 and FIG. 10. Therefore, overlapping description is omitted.

For example, it is assumed that the communication prediction apparatus 22 starts processing of predicting the aforementioned communication by using that the information processing terminal 10 starts a handover, as a trigger.

More specifically, for example, when the information processing terminal 10 which performs communication by an LTE performs a handover, a message is exchanged between a wireless base station, an MME, and an S-GW for the purpose of changing a communication route. Among messages to be exchanged, a message called "Modify Bearer Request" is transmitted from the MME to the S-GW by using a GTP. The communication prediction apparatus 22 may start processing of predicting the aforementioned communication by using that "Modify Bearer Request" is transmitted, as a trigger.

The prediction notifying unit 106 transmits, to the communication control device 40, a prediction result acquired by processing of predicting communication as prediction result information.

More specifically, in the following description, it is assumed that the communication control device 40 is the aforementioned MME, for example. In this case, the MME transmits, to the S-GW (communication prediction apparatus 22), "Modify Bearer Request" accompanied by handover performed by the information processing terminal 10. The S-GW replies, to the MME, "Modify Bearer Response" with respect to the transmitted "Modify Bearer Request". For example, the S-GW may give prediction result information to "Modify Bearer Response" to be replied.

In this case, for example, by adding a function of giving prediction result information to "Modify Bearer Response", the S-GW is able to easily implement the aforementioned operation. Specifically, by only adding the minimum function to a device configuration of an existing S-GW, the S-GW is able to transmit prediction result information to the MME. Further, even when a plurality of information processing terminals 10 try to perform a handover simultaneously or substantially simultaneously, the MME is able to specify an information processing terminal 10 for which handover processing is prioritized (suppressed), based on the received prediction result information. Consequently, the MME is able to improve communication quality.

In the aforementioned present example embodiment, however, to simplify description, an example of a configuration in which the prediction notifying unit 106 notifies the communication control device 40 of prediction result information by using that the information processing terminal 10 starts a handover, as a trigger is described, as an example. An example embodiment according to the present invention, however, is not limited to the aforementioned configuration. When the information processing terminal 10 is in a connected state (RRC_CONNECTED state) with a wireless base station, the prediction notifying unit 106 may periodically notify the communication control device 40 of prediction result information. Herein, RRC is an abbreviation of Radio Resource Control.

By the aforementioned configuration, the communication prediction apparatus 22 is able to reduce the number of requests of requesting wireless connection between the information processing terminal 10 and the communication control device 40. A reason for this is as follows.

Generally, for example, when the information processing terminal 10 in a connected state does not perform communication for a certain time, a communication state of the information processing terminal 10 shifts to an idle state (RRC_IDLE state). For example, when the information processing terminal 10 performs communication again immediately after the information processing terminal 10 shifts to an idle state, the information processing terminal 10 transmits a wireless connection request of requesting wireless connection to a wireless base station. Then, a communication state of the information processing terminal 10 shifts to a connected state again. In this case, the communication control device 40 to which prediction result information is notified from the communication prediction apparatus 22 is able to detect that the information processing terminal 10 performs communication immediately after the information processing terminal 10 shifts from a connected state to an idle state. Consequently, the communication control device 40 is able to cancel shifting from a connected state to an idle state.

Further, as another notification trigger, for example, the communication prediction apparatus 22 may notify the communication control device 40 of the aforementioned prediction result information by using that the communication control device 40 tries to shift a communication state of the information processing terminal 10 from a connected state to an idle state, as a trigger.

More specifically, for example, when a communication state of the information processing terminal 10 is shifted to an idle state, the S-GW (communication prediction apparatus 22) receives "Modify Bearer Request" from the MME (communication control device 40). Then, the S-GW disconnects connection to a wireless base station to which the information processing terminal 10 is communicatively connected. Therefore, the S-GW designates "Request rejected" of rejecting a connection request when the S-GW replies "Modify Bearer Response" to the MME. Further, the S-GW replies, to the MME, "Modify Bearer Response" to which a communication prediction result is given. Then, the MME is able to cancel processing of shifting a communication state of the information processing terminal 10 from a connected state to an idle state.

In this way, the S-GW is able to pause processing of shifting from a connected state to an idle state by the aforementioned reason, when it is predicted that communication is performed immediately after a communication state is shifted to an idle state. Thus, the S-GW is able to reduce the number of the aforementioned requests. Consequently, load of a mobile network device such as a wireless base station is reduced.

In this way, in the communication prediction apparatus 22 according to the present example embodiment, it is possible to provide the advantageous effects described in the respective example embodiments, and further, notify another device different from an own device of a prediction result (prediction result information) on communication to be performed by the information processing terminal 10.

A reason for this is that the communication prediction apparatus 22 further includes the prediction notifying unit 106 for notifying a device of a result predicted by the communication prediction unit 104.

Thus, for example, even when a device does not have a function of predicting communication to be performed by the information processing terminal 10, the device is able to perform communication control based on notified prediction result information. Further, for example, even when a device is unable to monitor communication to be performed between the information processing terminal 10 and the application server 30, and has difficulty in predicting the communication, the device is able to perform communication control based on notified prediction result information.

More specifically, generally, in a mobile network using an LTE, the following processing is separated.

Connection processing between the information processing terminal 10 and a mobile network and processing of a control system (C-plane) such as a handover, and processing of a data transfer system (U-Plane) for transferring data to be exchanged between the information processing terminal 10 and the application server 30.

Further, in a mobile network, a node for performing these processing is also separated. In the aforementioned configuration, processing of C-Plane is mainly performed by an MME. Further, it is known that processing of U-Plane is performed by an S-GW and a P-GW.

In view of the above, it is advantageous that communication prediction processing by the communication prediction apparatus 22 is mainly performed by a node which performs processing of U-Plane. Therefore, when suppression control and the like such as a handover is performed, based on prediction result information as described above, a node which performs processing of U-Plane needs to notify a node which performs processing of C-Plane of the prediction result information. In view of the above, it is assumed that the communication prediction apparatus 22 notifies the communication control device 40 different from an own device of prediction result information. Consequently, the communication control device 40 to which prediction result information is notified is able to more efficiently perform control relating to communication such as suppression control of a handover based on the prediction result information.

Fourth Example Embodiment

Next, an example embodiment based on the communication prediction apparatus 20 according to the aforementioned first example embodiment of the present invention is described. In the following description, features according to the present example embodiment are mainly described. In this case, overlapping description on similar components to the aforementioned respective example embodiments is omitted by assigning same reference numbers to the elements.

A communication prediction apparatus 23 in a fourth example embodiment of the present invention is described with reference to FIG. 14 and FIG. 15.

Figure 14:
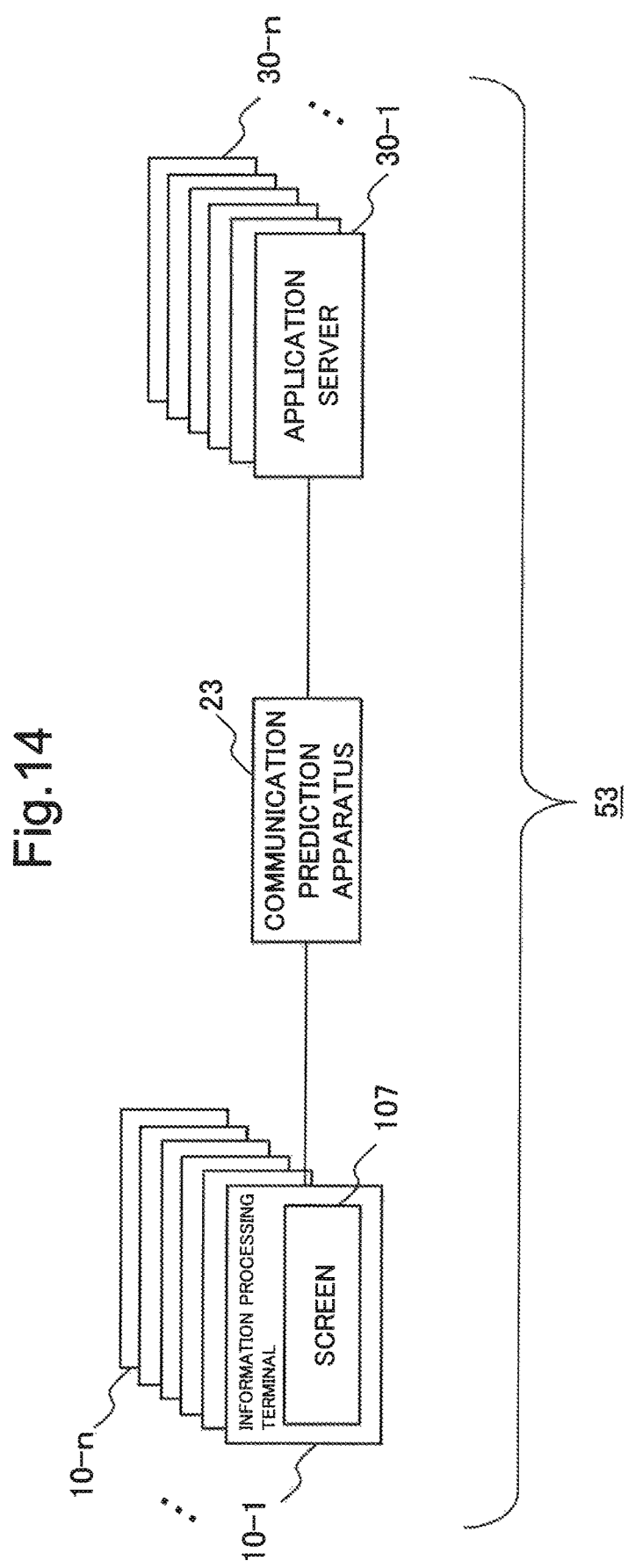
FIG. 14 is a block diagram illustrating a configuration of a communication system including a communication prediction apparatus in a fourth example embodiment of the present invention.
Figure 15:
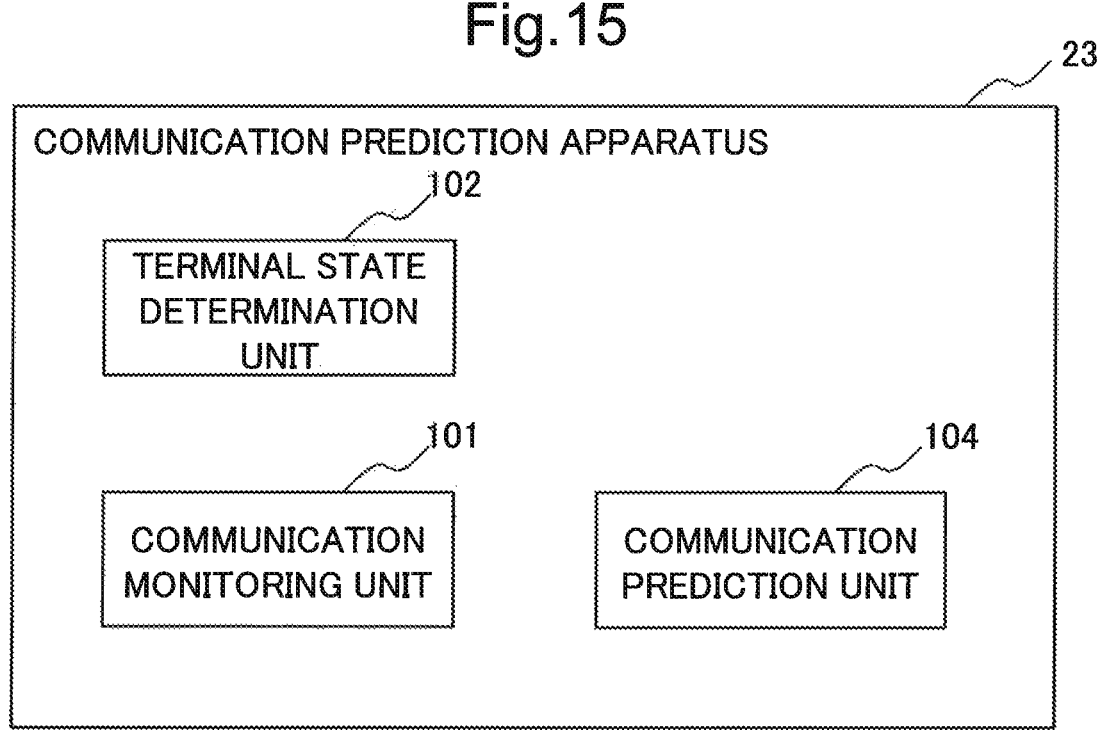
FIG. 15 is a block diagram illustrating a configuration of the communication prediction apparatus in the fourth example embodiment of the present invention.

FIG. 14 is a block diagram illustrating a configuration of a communication system 53 including the communication prediction apparatus 23 in the fourth example embodiment of the present invention. Further, FIG. 15 is a block diagram illustrating a configuration of the communication prediction apparatus 23 in the fourth example embodiment of the present invention.

In FIG. 14, the communication system 53 substantially includes one or more information processing terminals 10, the communication prediction apparatus 23, and one or more application servers 30. Further, the information processing terminal 10 includes a screen 107. In FIG. 15, the communication prediction apparatus 23 includes a communication monitoring unit 101, a terminal state determination unit 102, and a communication prediction unit 104.

The communication monitoring unit 101 monitors communication to be performed between the information processing terminal 10 as a target terminal being a monitoring target, and the application server 30 as an external device. Further, as a result of monitoring, the communication monitoring unit 101 generates monitoring communication information M including information relating to the communication.

The terminal state determination unit 102 determines a terminal state of the information processing terminal 10, based on at least the monitoring communication information M acquired from the communication monitoring unit 101.

The communication prediction unit 104 predicts communication to be performed by the information processing terminal 10 during a period from a target time until a time after lapse of a predetermined time, based on the following information.

Communication history information C, and
    a terminal state of the information processing terminal 10 at a target time, which is newly determined by the terminal state determination unit 102.

Herein, the communication history information C is information in which a determination result in the past among determination results determined by the terminal state determination unit 102, and the monitoring communication information M used in the determination are associated with each other.

For example, the communication prediction unit 104 predicts, as prediction of communication to be performed by the information processing terminal 10, whether or not communication is performed by the information processing terminal 10 during a period from a current time as a target time until a time after lapse of a predetermined time.

More specifically, the communication prediction unit 104 refers to the communication history information C, based on a terminal state of the information processing terminal 10 at a target time. Further, the communication prediction unit 104 acquires information (communication history) associated with a determination result in the past corresponding to the terminal state from among the communication history information C. The communication prediction unit 104 acquires a probability with which the information processing terminal 10 performs communication during a period from a target time until a time after lapse of a predetermined time, based on the acquired information. Then, the communication prediction unit 104 predicts that communication is performed by the information processing terminal 10, when the acquired probability is equal to or larger than a predetermined value.

In this way, in the communication prediction apparatus 23 according to the present example embodiment, even when a communication trend changes accompanied by a change in state of a target terminal, it is possible to more accurately predict communication to be performed by the target terminal. A reason for this is as follows.

Specifically, the communication prediction apparatus 23 includes the communication monitoring unit 101, the terminal state determination unit 102, and the communication prediction unit 104. More specifically, in the communication prediction apparatus 23 having the aforementioned device configuration, the communication monitoring unit 101 monitors communication to be performed by the information processing terminal 10 being a monitoring target. Then, the communication monitoring unit 101 generates the monitoring communication information M including information relating to communication as the monitoring result. The terminal state determination unit 102 determines a terminal state of the information processing terminal 10, based on the monitoring communication information M. The communication prediction unit 104 is able to predict communication to be performed by the information processing terminal 10 during a period from a target time until a time after lapse of a predetermined time, based on the communication history information C, and a terminal state of the information processing terminal 10 at the target time.

(Hardware Configuration Example)

It is possible to regard each unit illustrated in the drawings (FIG. 2, FIG. 9, FIG. 12, and FIG. 15) in the aforementioned example embodiments, as a functional unit (a processing unit, a software module) of a software program. These respective software modules may be implemented by a dedicated hardware. Classification of each unit illustrated in these drawings, however, is a configuration to simplify description. Various configurations may be presumed when the units are mounted. An example of a hardware environment in this case is described with reference to FIG. 16.

Figure 16:
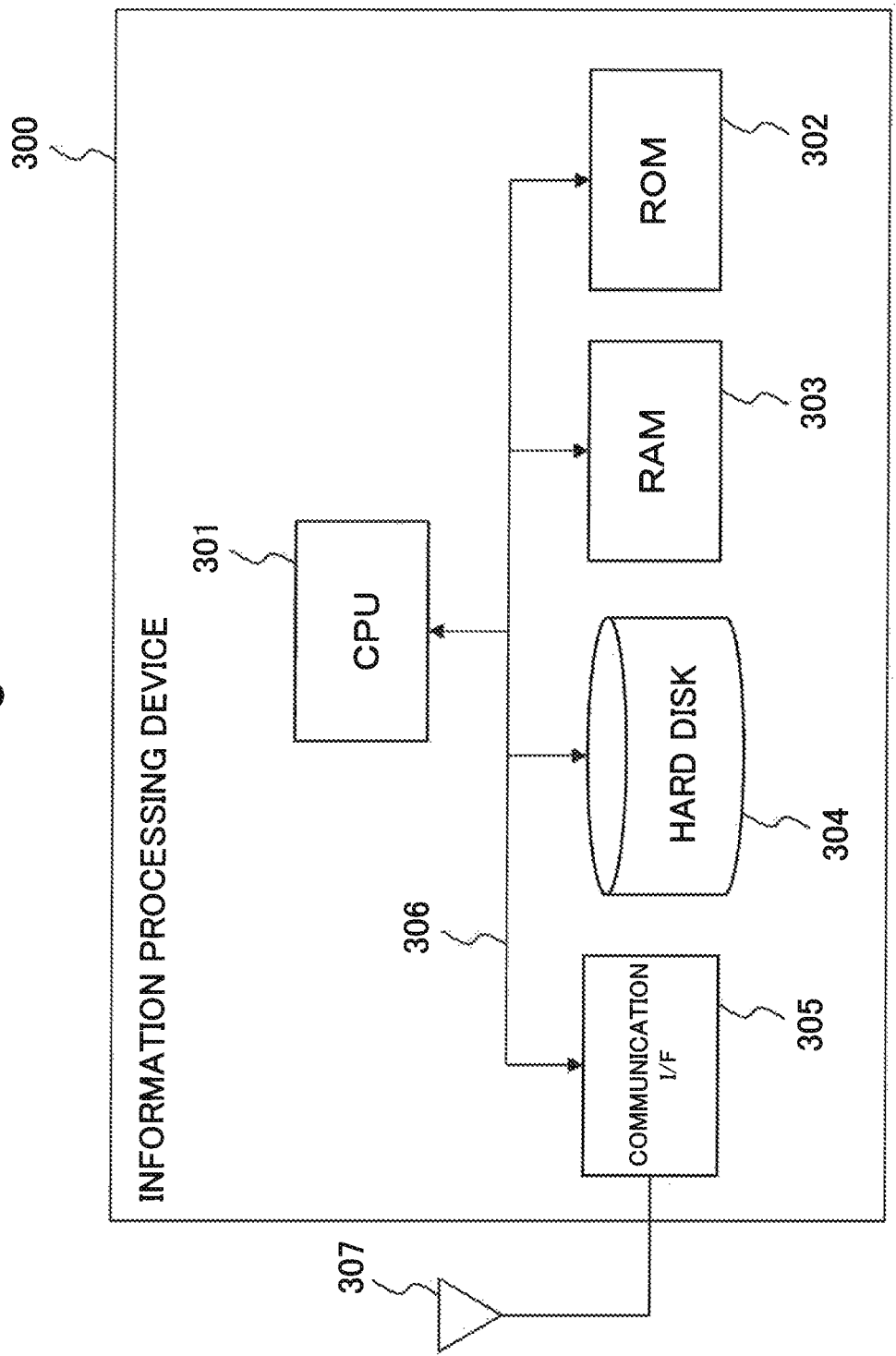
FIG. 16 is a block diagram exemplarily describing a hardware configuration of an information processing device capable of implementing the respective example embodiments according to the present invention.

FIG. 16 is a diagram exemplarily describing a configuration of an information processing device (computer) 300 on which a communication prediction apparatus according to an exemplary example embodiment of the present invention is executable. Specifically, FIG. 16 illustrates a configuration of a computer (information processing device) and a hardware environment capable of implementing each function in the aforementioned example embodiment. The computer is able to implement a communication prediction apparatus being the entirety or a part of the communication prediction apparatus 20 (FIG. 2), the communication prediction apparatus 21 (FIG. 9), the communication prediction apparatus 22 (FIG. 12), or the communication prediction apparatus 23 (FIG. 15).

The information processing device 300 illustrated in FIG. 16 is a general computer, to which the following configuration is connected via a bus (communication line) 306.

A CPU (Central Processing Unit) 301,
an ROM (Read Only Memory) 302,
an RAM (Random Access Memory) 303,
a hard disk (storage device) 304, and
a communication interface (indicated as a communication interface (I/F) in FIG. 16) 305 for performing wireless communication with an external device via an antenna 307.

Further, the present invention described by the aforementioned example embodiment as an example is achieved by the following procedure. Specifically, a computer program capable of implementing functions of block configuration diagrams (FIG. 2, FIG. 9, FIG. 12, and FIG. 15) or flowcharts (FIG. 5, FIG. 6, and FIG. 10), which are referred to in the aforementioned example embodiments, is supplied to the information processing device 300 illustrated in FIG. 16. Thereafter, the computer program is implemented by being read and executed on the CPU 301 of the hardware. Further, the computer program supplied in the device may be stored in a read-write temporary storage memory (RAM 303) or a non-volatile storage device such as the hard disk 304.

Further, in the aforementioned case, nowadays, it is possible to employ a general procedure, as a method for supplying a computer program in the hardware. For example, the supply method is a method for installing the computer program in the device via various types of recording media such as a CD-ROM, a method for downloading the computer program from outside via a communication line such as the Internet, and the like. Further, in this case, it is possible to regard that the present invention is configured by codes constituting the aforementioned computer program, or a recording medium storing the codes.

In the foregoing, the present invention is described by referring to the example embodiments. The present invention, however, is not limited to the aforementioned example embodiments. It is possible to apply various modifications comprehensible to a person skilled in the art to a configuration of the present invention within the scope of the present invention.

Note that a part or the entirety of the aforementioned respective example embodiments may be also described as the following supplementary notes. The present invention exemplarily described by the aforementioned respective example embodiments, however, is not limited to the following.

(Supplementary Note 1)

A communication prediction apparatus including:

a communication monitoring means for monitoring communication to be performed between a target terminal being a monitoring target and an external device, and generating monitoring communication information including information relating to the communication;

a terminal state determination means for determining a terminal state of the target terminal, based on at least the monitoring communication information; and a communication prediction means for predicting communication to be performed by the target terminal, based on a determination result in past among determination results determined by the terminal state determination means, communication history information associated with the monitoring communication information used in the determination, and a terminal state of the target terminal at a target time, which is newly determined by the terminal state determination means, during a period from the target time until a time after lapse of a predetermined time.

(Supplementary Note 2)

The communication prediction apparatus according to supplementary note 1, wherein the communication prediction means predicts, as prediction on communication to be performed by the target terminal, whether or not communication is performed by the target terminal during a period from the target time until a time after lapse of a predetermined time.

(Supplementary Note 3)

The communication prediction apparatus according to supplementary note 2, wherein the communication prediction means acquires, based on a terminal state of the target terminal at the target time, information associated with a determination result in the past corresponding to the terminal state from among the communication history information by referring to the communication history information, acquires a probability with which the target terminal performs communication during a period from the target time until a time after lapse of a predetermined time, based on the acquired information, and predicts that communication is performed by the target terminal, when the acquired probability is equal to or larger than a predetermined value.

(Supplementary Note 4)

The communication prediction apparatus according to any one of supplementary notes 1 to 3, including a terminal state prediction means for predicting a terminal state of the target terminal at a time after lapse of a predetermined time from the target time, based on the communication history information, wherein the communication prediction means predicts communication to be performed by the target terminal, based on a terminal state of the target terminal at a time after lapse of a predetermined time from the target time predicted by the terminal state prediction means, the communication history information, and a terminal state of the target terminal at a target time, which is newly determined by the terminal state determination means, during a period from the target time until a time after lapse of a predetermined time.

(Supplementary Note 5)

The communication prediction apparatus according to any one of supplementary notes 1 to 4, wherein the terminal state determination means determines, as determination on the terminal state, a state of a screen provided on the target terminal.

(Supplementary Note 6)

The communication prediction apparatus according to any one of supplementary notes 1 to 5, wherein the terminal state determination means determines, as determination on the terminal state, a communication state accompanied by an on-going application displayed on a screen provided on the target terminal.

(Supplementary Note 7)

The communication prediction apparatus according to any one of supplementary notes 1 to 6, wherein the terminal state determination means determines, as determination on the terminal state, a moving state indicating whether or not the target terminal is being carried.

(Supplementary Note 8)

The communication prediction apparatus according to any one of supplementary notes 1 to 7, further including a prediction notifying means for notifying another device different from an own device of prediction result information including a result predicted by the communication prediction means.

(Supplementary Note 9)

The communication prediction apparatus according to supplementary note 1, wherein the communication prediction means predicts, as prediction on communication to be performed by the target terminal, a data amount of communication to be performed by the target terminal during a period from the target time until a time after lapse of a predetermined time.

(Supplementary Note 10)

The communication prediction apparatus according to supplementary note 1, wherein the communication prediction means predicts, as prediction on communication to be performed by the target terminal, a frequency of communication to be performed by the target terminal during a period from the target time until a time after lapse of a predetermined time.

(Supplementary Note 11)

A communication prediction method including:

monitoring communication to be performed between a target terminal being a monitoring target and an external device, and generating monitoring communication information including information relating to the communication;

determining a terminal state of the target terminal by determination means, based on at least the monitoring communication information; and predicting communication to be performed by the target terminal, based on a determination result in past among determination results determined by the determination means, communication history information associated with the monitoring communication information used in the determination, and a terminal state of the target terminal at a target time, which is newly determined by the determination means, during a period from the target time until a time after lapse of a predetermined time.

(Supplementary Note 12)

A computer program, or a recording medium storing the computer program which causes a computer to implement:

a function of monitoring communication to be performed between a target terminal being a monitoring target and an external device, and generating monitoring communication information including information relating to the communication;

a determination function of determining a terminal state of the target terminal, based on at least the monitoring communication information; and a function of predicting communication to be performed by the target terminal, based on a determination result in past among determination results determined by the determination function, communication history information associated with the monitoring communication information used in the determination, and a terminal state of the target terminal at a target time, which is newly determined by the determination function, during a period from the target time until a time after lapse of a predetermined time.

In the foregoing, the present invention is described by the aforementioned example embodiments as exemplary examples. The present invention, however, is not limited to the aforementioned example embodiments. Specifically, the present invention is applicable to various aspects comprehensible to a person skilled in the art within the scope of the present invention.

This application claims the priority based on Japanese Patent Application No. 2015-237765 filed on Dec. 4, 2015, the disclosure of which is incorporated herein.

REFERENCE SIGNS LIST 10, 10-1 to 10-$n$, 10-$k$ Information processing terminal
20 Communication prediction apparatus
21 Communication prediction apparatus
22 Communication prediction apparatus
23 Communication prediction apparatus
30, 30-1 to 30-$n$ Application server
40 Communication control device
50 Communication system
51 Communication system
52 Communication system
53 Communication system
101 Communication monitoring unit
102 Terminal state determination unit
103 Communication history storage unit
104, 114 Communication prediction unit
105 Terminal state prediction unit
106 Prediction notifying unit
107 Screen
110 Communication history
300 Information processing device
301 CPU
302 ROM
303 RAM
304 Hard disk
305 Communication interface
306 Bus
307 Antenna

What is claimed is:

1. A communication prediction apparatus comprising:
a memory storing one or more instructions; and
a processor configured to execute the one or more instructions to implement:
a communication monitor for monitoring communication to be performed between a target terminal being a monitoring target and an external device, and generating monitoring communication information including information relating to the communication;

a terminal state determiner for determining a terminal state of the target terminal, based on at least the monitoring communication information; and a communication predictor for predicting communication to be performed by the target terminal, based on a determination result in past among determination results determined by the terminal state determiner, communication history information associated with the monitoring communication information used in the determination, and a terminal state of the target terminal at a target time, which is newly determined by the terminal state determiner, during a predetermined period from the target time.

2. The communication prediction apparatus according to claim 1, wherein the communication predictor predicts, as prediction on communication to be performed by the target terminal, whether or not communication is performed by the target terminal during a period from the target time until a time after lapse of a predetermined time.

3. The communication prediction apparatus according to claim 2, wherein the communication predictor acquires, based on a terminal state of the target terminal at the target time, information associated with a determination result in the past corresponding to the terminal state from among the communication history information by referring to the communication history information, acquires a probability with which the target terminal performs communication during a period from the target time until a time after lapse of a predetermined time, based on the acquired information, and predicts that communication is performed by the target terminal, when the acquired probability is equal to or larger than a predetermined value.

4. The communication prediction apparatus according to claim 1, wherein the processor is further configured to execute the one or more instructions to implement:

a terminal state predictor for predicting a terminal state of the target terminal at a time after lapse of a predetermined time from the target time, based on the communication history information, wherein the communication predictor predicts communication to be performed by the target terminal, based on a terminal state of the target terminal at a time after lapse of a predetermined time from the target time being predicted by the terminal state predictor, the communication history information, and a terminal state of the target terminal at a target time, which is newly determined by the terminal state determiner, during a period from the target time until a time after lapse of a predetermined time.

5. The communication prediction apparatus according to claim 1, wherein the terminal state determiner determines, as determination on the terminal state, a state of a screen provided on the target terminal.

6. The communication prediction apparatus according to claim 1, wherein the terminal state determiner determines, as determination on the terminal state, a communication state accompanied by an on-going application displayed on a screen provided on the target terminal.

7. The communication prediction apparatus according to claim 1, wherein the terminal state determiner determines, as determination on the terminal state, a moving state indicating whether or not the target terminal is being carried.

8. The communication prediction apparatus according to claim 1, configured to execute the one or more instructions to implement:

a prediction notifier for notifying another device different from an own device of prediction result information including a result predicted by the communication predictor.

9. The communication prediction apparatus according to claim 1, wherein the communication predictor predicts, as prediction on communication to be performed by the target terminal, a data amount of communication to be performed by the target terminal during a period from the target time until a time after lapse of a predetermined time.

10. The communication prediction apparatus according to claim 1, wherein the communication predictor predicts, as prediction on communication to be performed by the target terminal, a frequency of communication to be performed by the target terminal during a period from the target time until a time after lapse of a predetermined time.

11. A communication prediction method comprising:

monitoring communication to be performed between a target terminal being a monitoring target and an external device, and generating monitoring communication information including information relating to the communication;

determining a terminal state of the target terminal by a determiner, based on at least the monitoring communication information; and predicting communication to be performed by the target terminal, based on a determination result in past among determination results determined by the determiner, communication history information associated with the monitoring communication information used in the determination, and a terminal state of the target terminal at a target time, which is newly determined by the determiner, during a predetermined period from the target time.

12. A non-transitory recording medium storing a computer program, when executed by a computer, causes the computer to implement:

a function of monitoring communication to be performed between a target terminal being a monitoring target and an external device, and generating monitoring communication information including information relating to the communication;

a determination function of determining a terminal state of the target terminal, based on at least the monitoring communication information; and a function of predicting communication to be performed by the target terminal, based on a determination result in past among determination results determined by the determination function, communication history information associated with the monitoring communication information used in the determination, and a terminal state of the target terminal at a target time, which is newly determined by the determination function, during a predetermined period from the target time.

* * * * *